(12) United States Patent
Rashidinejad et al.

(10) Patent No.: US 11,483,069 B2
(45) Date of Patent: Oct. 25, 2022

(54) SELF-REFERENCED METHOD AND APPARATUS FOR IN-OPERATION MEASUREMENT OF A COHERENT OPTICAL TRANSMITTER'S MODULATION LOSS

(71) Applicant: Infinera Corp., Annapolis, MD (US)

(72) Inventors: Amir Rashidinejad, Annapolis Junction, MD (US); Matthew Fisher, Annapolis Junction, MD (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/375,867

(22) Filed: Jul. 14, 2021

(65) Prior Publication Data

US 2022/0021450 A1    Jan. 20, 2022

Related U.S. Application Data

(60) Provisional application No. 63/051,836, filed on Jul. 14, 2020.

(51) Int. Cl.
| | | |
|---|---|---|
| *H04B 10/04* | (2006.01) | |
| *H04B 10/079* | (2013.01) | |
| *H04B 10/564* | (2013.01) | |
| *H04B 10/50* | (2013.01) | |

(52) U.S. Cl.
CPC . *H04B 10/07955* (2013.01); *H04B 10/50597* (2013.01); *H04B 10/564* (2013.01)

(58) Field of Classification Search
CPC ........ H04B 10/07955; H04B 10/50597; H04B 10/564; H04B 10/516; H04B 10/548; H04B 10/532; H04B 10/40; H04B 10/5057; H04B 10/50575; H04B 10/50595; H04J 14/06; G02F 1/225; G02F 1/2255; G02F 1/2257
USPC ....... 398/183, 188, 184, 192, 193, 194, 195, 398/196, 197, 198, 200, 201, 33, 38, 159, 398/135, 136, 137, 138, 139; 385/1, 2, 3
See application file for complete search history.

(56) References Cited

U.S. PATENT DOCUMENTS

| | | | |
|---|---|---|---|
| 9,294,200 B2 * | 3/2016 | Mak ...................... | G02F 1/0123 |
| 9,450,677 B2 * | 9/2016 | Akashi ............. | H04B 10/50575 |
| 9,692,518 B2 * | 6/2017 | Bhandare ........... | H04B 10/5561 |

* cited by examiner

*Primary Examiner* — Hanh Phan
(74) *Attorney, Agent, or Firm* — Dunlap Codding P.C.; David L. Soltz

(57) ABSTRACT

An optical network component and method are herein described. The system and method include determining a first power of an optical modulator using a first photodetector and a second power of the transmitter using a second photodetector, determining a contrast ratio based on the first power and the second power, and determining a modulation loss based on the contrast ratio.

20 Claims, 11 Drawing Sheets

SELF-REFERENCED METHOD AND APPARATUS FOR IN-OPERATION MEASUREMENT OF A COHERENT OPTICAL TRANSMITTER'S MODULATION LOSS

CROSS REFERENCE TO RELATED APPLICATIONS

This application claims the benefit under 35 U.S.C. § 119(e) to U.S. Provisional Patent Application No. 63/051,836, filed Jul. 14, 2020, which is incorporated herein by reference in its entirety.

BACKGROUND

Optical communication systems typically include a first node that supplies optical signals carrying user information or data to a second node that receives such optical signals via an optical communication path that connects the first node to the second node. In certain optical communication systems, the first node is a so-called hub node that communicates with a plurality of second nodes, also referred to as leaf nodes. The optical communication paths that connect the hub with multiple leaf nodes may include one or more segments of optical fiber connected to one another by various optical components or sub-systems, such as optical amplifiers, optical splitters and combiners, optical multiplexers and demultiplexers, and optical switches, for example, wavelength selective switches (WSS). The optical communication path and its associated components may be referred to as a line system.

In each node, the coherent optical transmitter is composed of various electrical and optical components that introduce loss terms in the transmitted optical signals, compared to an unmodulated optical carrier. The net loss due to data modulation is referred to as modulation loss. The modulation loss of a transmitter is not fixed and may change over time, for example, due to age, temperature, or damage of the transmitter. Because modulation loss is utilized to characterize the optical signal to noise ratio of the transmitter (TOSNR), as well as the reach and capacity of the transmitter, quick and accurate measurement of the modulation loss is required. The modulation loss of a transmitter may be affected by varying the controllable gain and/or loss elements of the various electrical and optical components of the transmitter, for example, the gain of the modulator driver. If the modulation loss is too low, the TOSNR may be negatively impacted due to nonlinearity in the optical signal; however, if the modulation loss is too high, the transmitter power is too low causing the TOSNR to be too low, again negatively affecting transmission of the optical signal.

Known methods of determining modulation loss may require external equipment to measure the modulation loss of the transmitter, estimate the modulation loss based on the electrical signal swing at the modulator and the modulator's known Vpi voltage, which increases inaccuracy of the measurement, and generally take longer to determine the modulation loss. Furthermore, all existing methods require placing the transmitter in a calibration/test mode and thus cannot operate in real-time operation of the transmitter.

Thus, a need exists for a self-referenced system and method to precisely and rapidly characterize modulation loss using electrical and optical components available on the transmitter. It is to such a system and method that the present disclosure is directed.

SUMMARY

The problem of precisely and rapidly characterizing modulation loss of a transmitter is solved by determining a first power of an optical modulator using a first photodetector and a second power of the transmitter using a second photodetector, determining a contrast ratio based on the first power and the second power, and determining a modulation loss based on the contrast ratio.

In some embodiments, the problem of precisely and rapidly characterizing modulation loss is solved by a transmitter, comprising: a laser operable to supply an optical signal; a digital signal processor operable to supply first electrical signals based on data input to the digital signal processor; a digital-to-analog conversion circuitry operable to output second electrical signals based on the first electrical signals; a modulator driver circuitry operable to output third electrical signals based on the second electrical signals; an optical modulator having a high-speed phase modulator and a phase adjuster, operable to supply a first modulated optical signal based on the third electrical signals at a first point in time, the first modulated optical signal having a first power, and to supply a second modulated optical signal not based on the third electrical signals at a second point in time, the second modulated optical signal having a second power; an optical combiner directing a first portion of the first modulated optical signal and a first portion of the second modulated optical signal to a complementary photodetector; the complementary photodetector operable to measure the first power of the first portion of the first modulated optical signal at the first point in time and operable to measure the second power of the first portion of the second modulated optical signal at the second point in time; and control and monitoring circuitry coupled to the complementary photodetector, the control and monitoring circuitry operable to compute a contrast ratio using at least the first power and the second power, and determine a modulation loss based at least in part on the contrast ratio.

Other implementations are directed to systems, hub transceivers, devices, and non-transitory, computer-readable media having instructions stored thereon, that when executed by one or more processors, cause the one or more processors to perform operations described herein.

The details of one or more implementations of the subject matter described in this specification are set forth in the accompanying drawings and the description below. Other aspects, features and advantages of the subject matter will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

Like reference numbers and designations in the various drawings indicate like elements.

DETAILED DESCRIPTION

Figure 1:
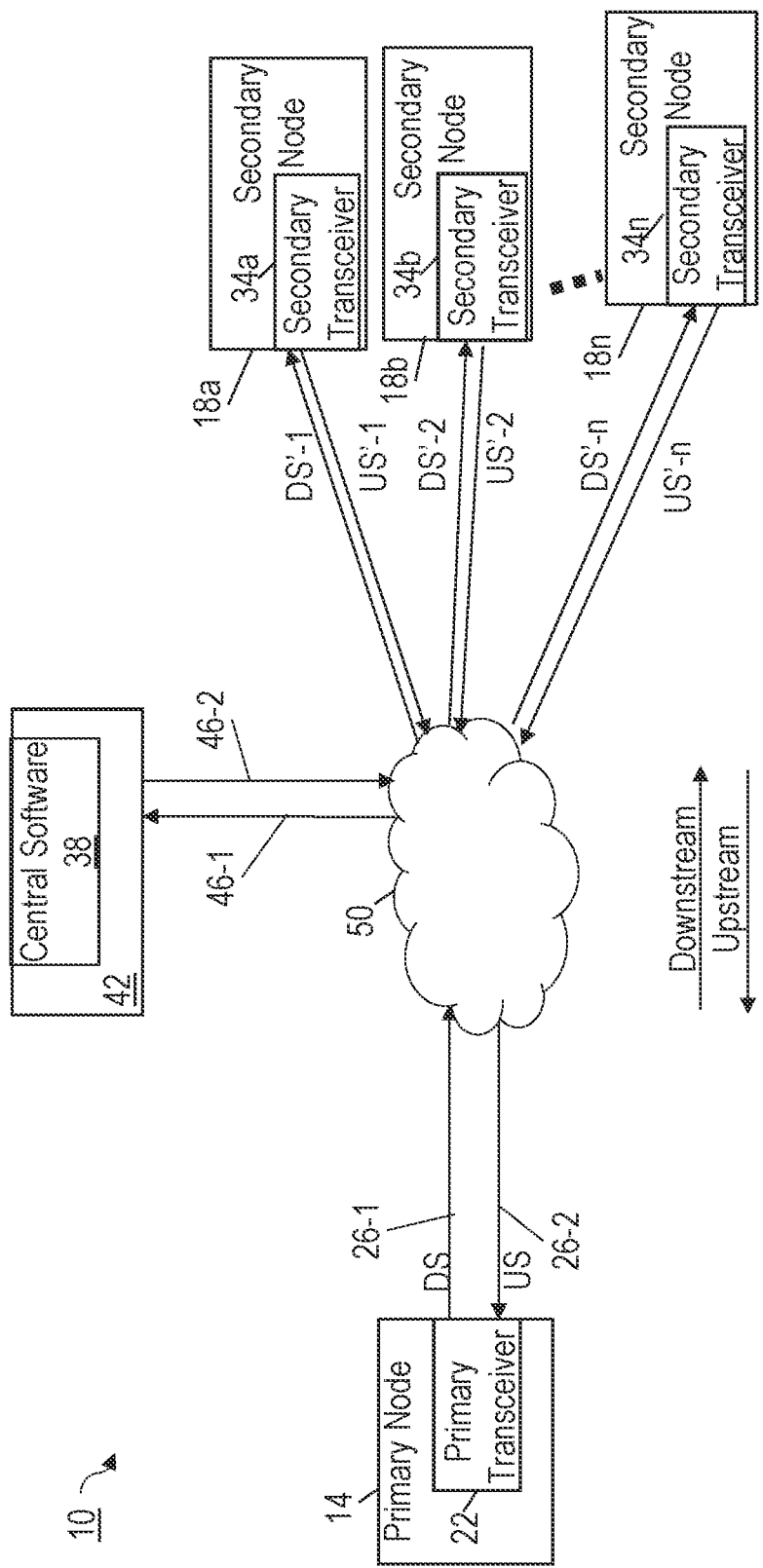
FIG. 1 is a block diagram of an exemplary embodiment of an optical communication system constructed in accordance with the present disclosure.

The following detailed description refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. It is not intended that the scope of the invention be limited to the specific values recited when defining a range. All ranges are inclusive and combinable.

When values are expressed as approximations, by use of the antecedent "about," it will be understood that the particular value forms another embodiment. Reference to a particular numerical value includes at least that particular value, unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like. Further, the messages described herein may be generated by the components and result in various physical transformations.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

Referring now to the drawings, and in particular to FIG. 1, shown therein is a diagram of an exemplary embodiment of an optical communication system 10 constructed in accordance with the present disclosure. The optical communication system 10 generally includes a primary node 14, such as a router, and one or more secondary node 18 shown as secondary nodes 18a-18n.

In one embodiment, the primary node 14 includes a primary transceiver 22 (or transceiver module) that is operable to supply a downstream optical signal (DS), including optical subcarriers, to an optical fiber link 26-1 (e.g., part of a first or downstream optical communication path), and receives an upstream signal (US) from an optical fiber link 26-2 (e.g., part of a second or upstream optical communication path). In one embodiment, the primary transceiver or primary transceiver 22 may be referred to as a hub transceiver or hub transceiver module. The downstream optical signal DS is fed by the optical fiber link 26-1 to one or more optical line system component, such as an optical amplifier, an erbium-doped fiber amplifier, an add-drop module, an optical gateway, a ROADM, and/or the like. As discussed in greater detail below with reference to FIG. 2, the optical signals DS and US may each include one or more optical subcarrier, such as a Nyquist optical subcarrier.

In one embodiment, the secondary node 18 includes a secondary transceiver 34 that is operable to transmit optical signals to the primary node 14 and to receive optical signals from the primary node 14. In one embodiment, the optical communication system 10 includes more than one primary node 14, each of which communicates with one or more secondary node 18.

In one embodiment, the primary transceiver 22 includes a transmitter, described below and shown in FIG. 4, that receives data and outputs an optical signal including one or more optical subcarrier. Each optical subcarrier is indicative of the received data. In one embodiment, the primary node 14 includes more than one primary transceiver 22. In this embodiment, the transmitter 70 of each primary transceiver 22 supplies a corresponding optical signal with an associated group of subcarriers.

In one embodiment, each secondary node 18 may have a structure similar to the primary node 14 and may operate in a manner similar to that described above with respect to the primary node 14.

As further shown in FIG. 1, each secondary transceiver 34 may have a structure similar to and operate in manner similar to that described above with respect to the primary transceiver 22. In one example, however, each of the secondary transceivers 34 may supply a modulated optical signal US'-1 to US'-n in an upstream direction. Each such optical signal may include one or more optical subcarriers. Collectively, a number of the optical subcarriers output from the secondary transceivers 34 may be equal to, less than, or greater than the number of optical subcarriers output from the primary transceiver 22.

The optical signals US'-1 to US'-n may be combined by a combiner in optical line system 50 and output towards the primary node 14 in combined form as the upstream optical signal US. The optical signal US may then be provided to the primary transceiver 22 via the optical fiber link 26-2.

Figure 2:
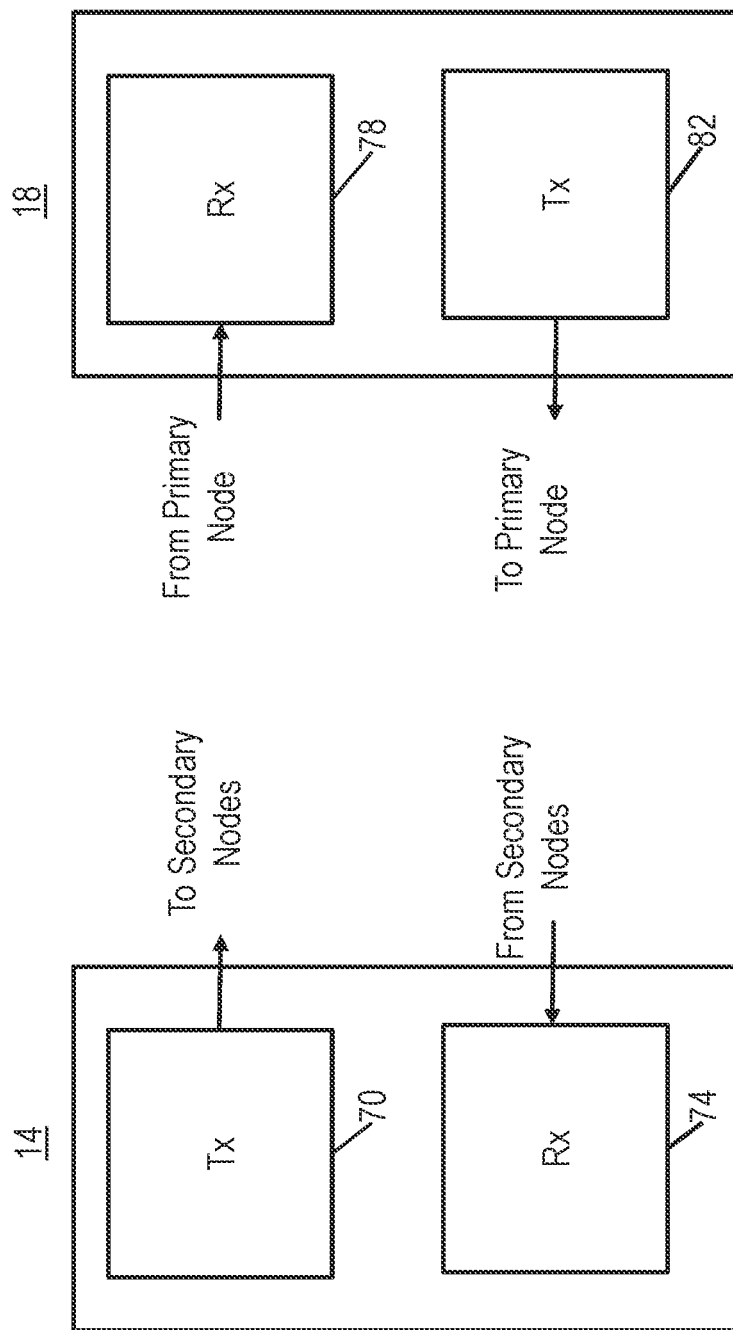
FIG. 2 is a block diagram of an exemplary embodiment of a primary node and a secondary node of FIG. 1 constructed in accordance with the present disclosure.

Referring now to FIG. 2, shown therein is a block diagram of an exemplary embodiment of the primary node 14 constructed in accordance with the present disclosure. The primary node 14 may include a transmitter 70 that supplies a downstream modulated optical signal including subcarriers, and a receiver that 74 that may receive upstream subcarriers carrying data originating from the secondary nodes 18, such as from secondary transceivers 34a-n. The transmitter 70 and the receiver 74, in one example, collectively constitute a primary node 14 or primary transceiver 22.

FIG. 2 further shows a block diagram of an exemplary embodiment of one of the secondary node 18a-n, which may include a receiver 78 that receives one or more downstream transmitted subcarriers, and a transmitter 82 that transmits one or more subcarriers in the upstream direction. Collectively, receiver 78 and transmitter 82 constitute a secondary node 18 or edge node transceiver.

Details of the transmitters 70, 82 and the receivers 74, 78 of the primary node 14 and the secondary node 18, respectively, are described in more detail below. It is understood that the transmitters 70, 82 have a similar structure and operate in a similar manner. Additionally, it is understood that the receivers 74, 78 have a similar structure and operate in a similar manner.

Figure 3A:
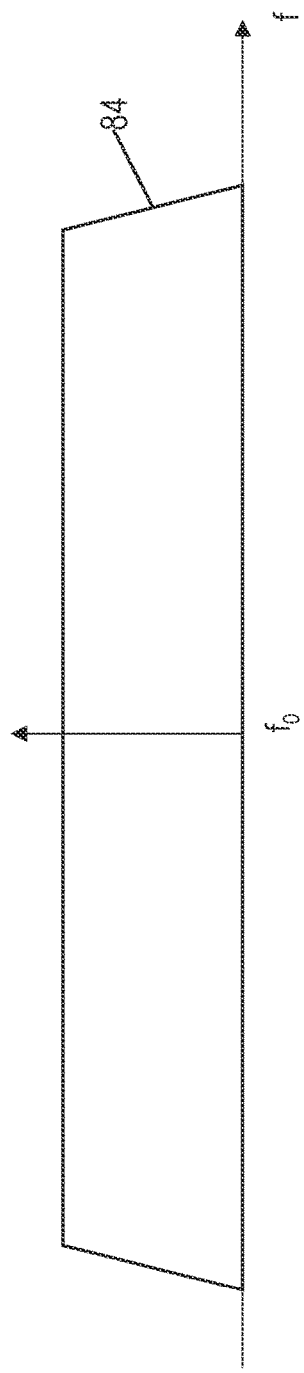
FIG. 3A is a diagram of an exemplary embodiment of an optical signal having a single subcarrier in accordance with the present disclosure.

Referring now to FIG. 3A, shown therein is a diagram of an exemplary embodiment of a single-carrier optical signal 84 constructed in accordance with the present disclosure. The single-carrier optical signal 84 includes a single carrier, or a single subcarrier, that may be output be the transmitter 70 of the primary transceiver 22. The single carrier may be a Nyquist carrier and may have an optical spectral bandwidth that is at least equal to the Nyquist frequency, as determined by the baud rate of the single carrier. The single carrier may be centered around a frequency, $f_0$.

Figure 3B:
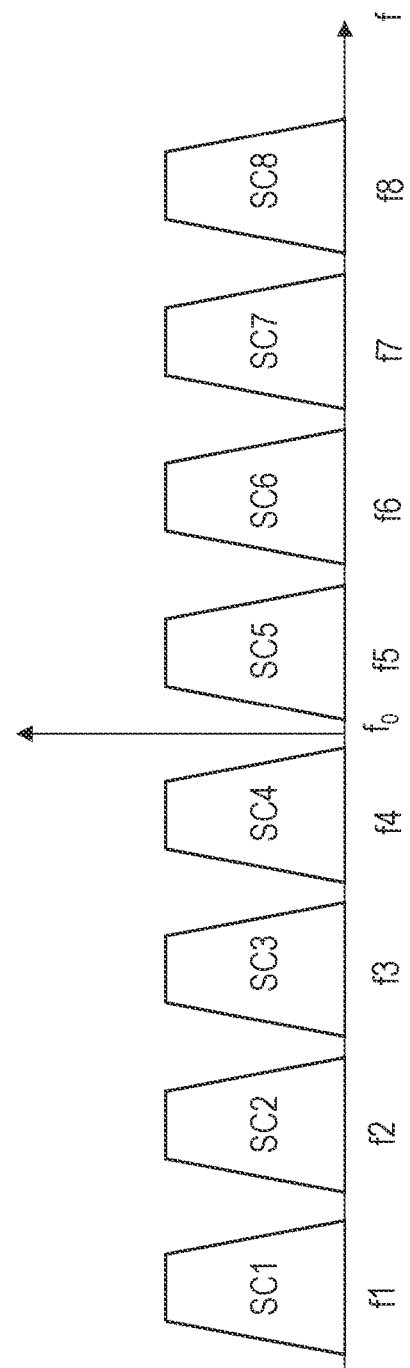
FIG. 3B is a diagram of an exemplary embodiment of an optical signal having multiple subcarriers in accordance with the present disclosure.

Referring now to FIG. 3B, shown therein is a diagram of an exemplary embodiment of an optical signal in accordance with the present disclosure. The optical signal includes a plurality of subcarriers, SC1 to SC8 that may be output by the transmitter 70 of the primary transceiver 22. Each of the subcarriers SC1 to SC8 may have a corresponding one of a plurality of frequencies f1 to f8. In addition, each of the subcarriers SC1 to SC8 may be a Nyquist subcarrier. In general, each subcarrier may have an optical spectral bandwidth that is at least equal to the Nyquist frequency, as determined by the baud rate of such subcarrier.

A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser.

As discussed in greater detail below, the optical subcarriers SC1 to SC8 are generated by modulating light output from a laser. The frequency of such laser output light is f0 and is typically a center frequency such that half the subcarrier subcarriers (e.g., f5 to f8) are above f0, e.g., have a greater frequency than f0, and half the subcarrier frequencies (e.g., f1 to f4) are below f0, e.g., have a lesser frequency than f0.

Figure 4:
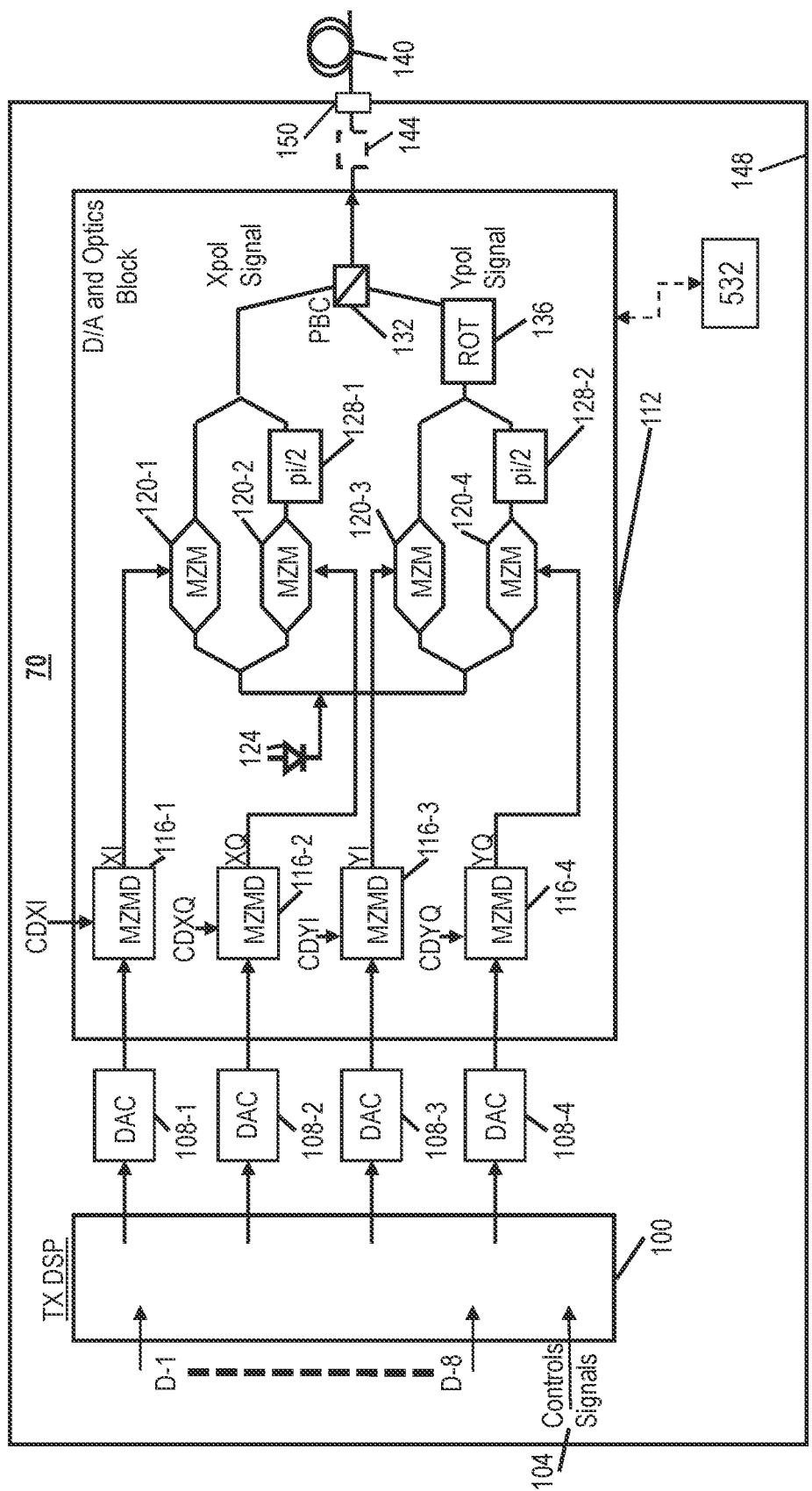
FIG. 4 is a block diagram of an exemplary embodiment a transmitter shown in FIG. 2 and constructed in accordance with the present disclosure.

Referring now to FIG. 4, shown therein is a diagram of an exemplary embodiment of the transmitter 70 constructed in accordance with the present disclosure. The transmitter 70 includes a digital signal processor (DSP 100). In this example, the DSP 100 receives data including one or more of eight data streams D1 to D8, each carrying user data or information. Such data is processed (e.g., as discussed in greater detail with respect to FIG. 6), and the processed data is provided to the DACs 108. Second data, including, for example, controls signal 104 destined for a local transceiver control functions as well as a downstream transceiver (e.g., the secondary transceivers 34), amplitude modulated tones, and the like may also be input to the DSP 100, which processes such information and combines the information with the data at the output.

As further shown in FIG. 4, the DSP block 100 supplies digital signals to DACs 108-1 to 108-4 of a D/A and Optics block 112. Each of the DACs 108 is a digital-to-analog conversion circuit and is operable to output first electrical signals based on the digital signals supplied by the DSP 100. The D/A and optics block 112 also includes modulator driver circuitry (MZMD 116-1 to 116-4). Each MZMD 116 is operable to output second electrical signals based on the first electrical signals received from a particular DAC 108.

The D/A and optics block 112 further includes optical modulator circuitry (MZM 120-1 to 120-4). Each MZM 120 is operable to output a first modulated optical signal or a second modulated optical signal based on the second electrical signals. The first modulated optical signal includes multiple optical subcarriers (e.g., the optical subcarriers SC1 to SC8) carrying user data to be transmitted between nodes of the optical communication system 10, and the second modulated optical signal is, for example, applying data to the orthogonal polarization, such as polarization multiplexing.

Figure 7:
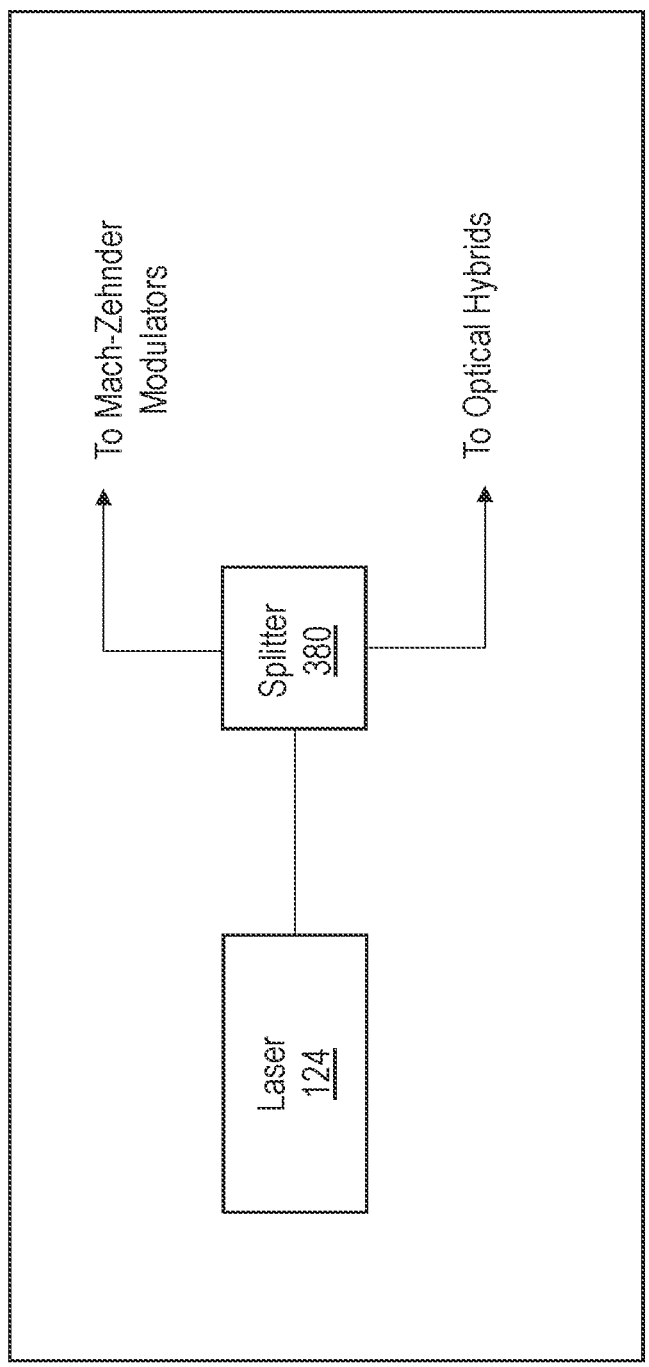
FIG. 7 is a diagram of an exemplary embodiment of a shared laser constructed in accordance with the present disclosure.

Each of the MZMs 120-1 to 120-4 of the D/A and optics block 112 may be a Mach-Zehnder Modulator (MZM) that modulates the phase and/or amplitude of the light output from a laser 124. As further shown in FIG. 4, a light beam output from the laser 124 (also included in the optics block 112) is split such that a first portion of the light is supplied to a first MZM pairing including the MZMs 120-1 and 120-2 and a second portion of the light is supplied to a second MZM pairing including the MZMs 120-3 and 120-4. The laser 124 can be a shared laser (as shown in FIG. 7), or an unshared laser where the transmitter 70 and the receiver 74 include separate lasers 124.

The first portion of the light is further split into third and fourth portions, such that the third portion is modulated by the MZM 120-1 to provide an in-phase (I) component of an X (or TE) polarization component of a modulated optical signal, and the fourth portion is modulated by the MZM 120-2 and fed to a phase shifter 128-1 to shift the phase of such light by 90 degrees in order to provide a quadrature (Q) component of the X polarization component of the modulated optical signal.

Similarly, the second portion of the light is further split into fifth and sixth portions, such that the fifth portion is modulated by the MZM 120-3 to provide an I component of a Y (or TM) polarization component of the modulated optical signal, and the sixth portion is modulated by the MZM 120-4 and fed to a phase shifter 128-2 to shift the phase of such light by 90 degrees to provide a Q component of the Y polarization component of the modulated optical signal.

The optical outputs of the MZMs 120-1 and 120-2 are combined to provide an X polarized optical signal including I and Q components and fed to a polarization beam combiner (PBC 132) provided in the optics block 112. In addition, the outputs of the MZMs 120-3 and 120-4 are combined to provide an optical signal that is fed to a polarization rotator 136, further provided in the optics block 112, that rotates the polarization of such optical signal to provide a modulated optical signal having a Y (or TM) polarization. The Y polarized modulated optical signal is also provided to a PBC 132, which combines the X and Y polarized modulated optical signals to provide a polarization multiplexed ("dual-pol") modulated optical signal onto an optical fiber 140. In some examples, the optical fiber 140 may be included as a segment of optical fiber in an example optical communication path of the optical communication system 10.

In some implementations, the polarization multiplexed optical signal output from the D/A and optics block 112 includes the optical subcarriers SC1-SC8 (e.g., of FIG. 3B), for example, such that each data subcarrier 300 has X and Y polarization components and I and Q components.

In one embodiment, as shown in FIG. 4, each of the control signals CDXI, CDXQ, CDYI, and CDYQ may be supplied to respective one of the MZMD 116-1 to 116-4. These control signals are indicative of an amplitude modulation scalar, and, based on these control signals, the MZMD 116 may further adjust the analog signals received from the DACs 108 in accordance with such amplitude modulation scalar, such that the MZM 120 are driven in such a manner as to collectively amplitude modulate the subcarriers SC1 to SC8r.

In another example, an optical component 144 may be provided to receive an optical signal including the optical subcarriers SC1 to SC8 output from the PBC 132. The optical component 144 may be any of a variable optical attenuator, an amplifier, a filter, such as a tunable filter, and/or the like. The optical component 144 may be operable to modify the optical signal output from the PBC 132. For example, if the optical component is a VOA, the VOA may be operable to adjust or vary the attenuation of the optical signal. By varying the attenuation experienced by the optical subcarriers SC1 to SC8, the amplitude or intensity of such subcarriers may be adjusted or controlled, such that the subcarriers SC1 to SC8 are amplitude modulated.

The transmitter 70 may be provided in the module 148, which may also house a receiver 74 of the primary transceiver 22 of the primary node 14. Although the optical component 144 is shown inside the module 148, it is understood that the optical component 144 may be provided outside the module 148.

In one embodiment, the transmitter 70 includes one or more optical tap 150 disposed between the PBC 132 and the optical fiber 140 and in optical communication to receive a portion of the optical signal from the PBC 132. In the embodiment where the optical component 144 is included in the transmitter 70, the optical tap 150 may be disposed between the optical component 144 and the PBC 132 and/or disposed between the optical component 144 and the optical fiber 140.

Figure 5:
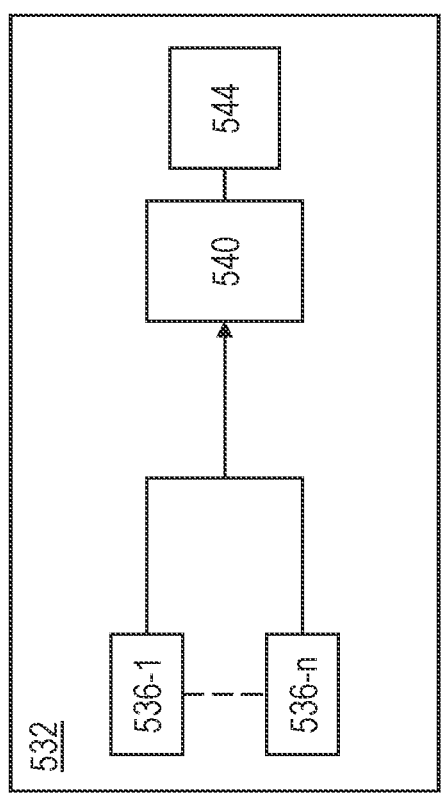
FIG. 5 is a functional block diagram of an exemplary embodiment of the control and monitoring circuitry of FIG. 4 constructed in accordance with the present disclosure.

Referring now to FIG. 5, shown therein is a functional block diagram of the control and monitoring circuitry 532 constructed in accordance with the present disclosure. The control and monitoring circuitry 532 may include one or more analog-to-digital converter 536 operable to receive an analog signal, such as a power or current from a photodetector, and output a digital signal indicative of the analog signal. In one embodiment, the output may be processed by a processor 540 in communication with a memory 544. The processor 540 may include one or more processor and may comprise one of more of a processor, a microprocessor, an application specific integrated circuit (ASIC), a field programmable gate array (FPGA), or other circuitry operable to process the digital signals and communicate with the memory 544. The memory 544 is a non-transitory computer readable medium operable to store computer readable instructions that when read by the processor 540 cause the processor 540 to perform a particular function, process, or task. In one embodiment, the monitoring circuitry 532 is embedded in or integrated into a single device and may be implemented, for example, on an ASIC.

While FIG. 5 shows the control and monitoring circuitry 532 as including a particular quantity and arrangement of functional components, in some implementations, the control and monitoring circuitry 532 may include additional functional components, fewer functional components, different functional components, or differently arranged functional components.

Figure 6:
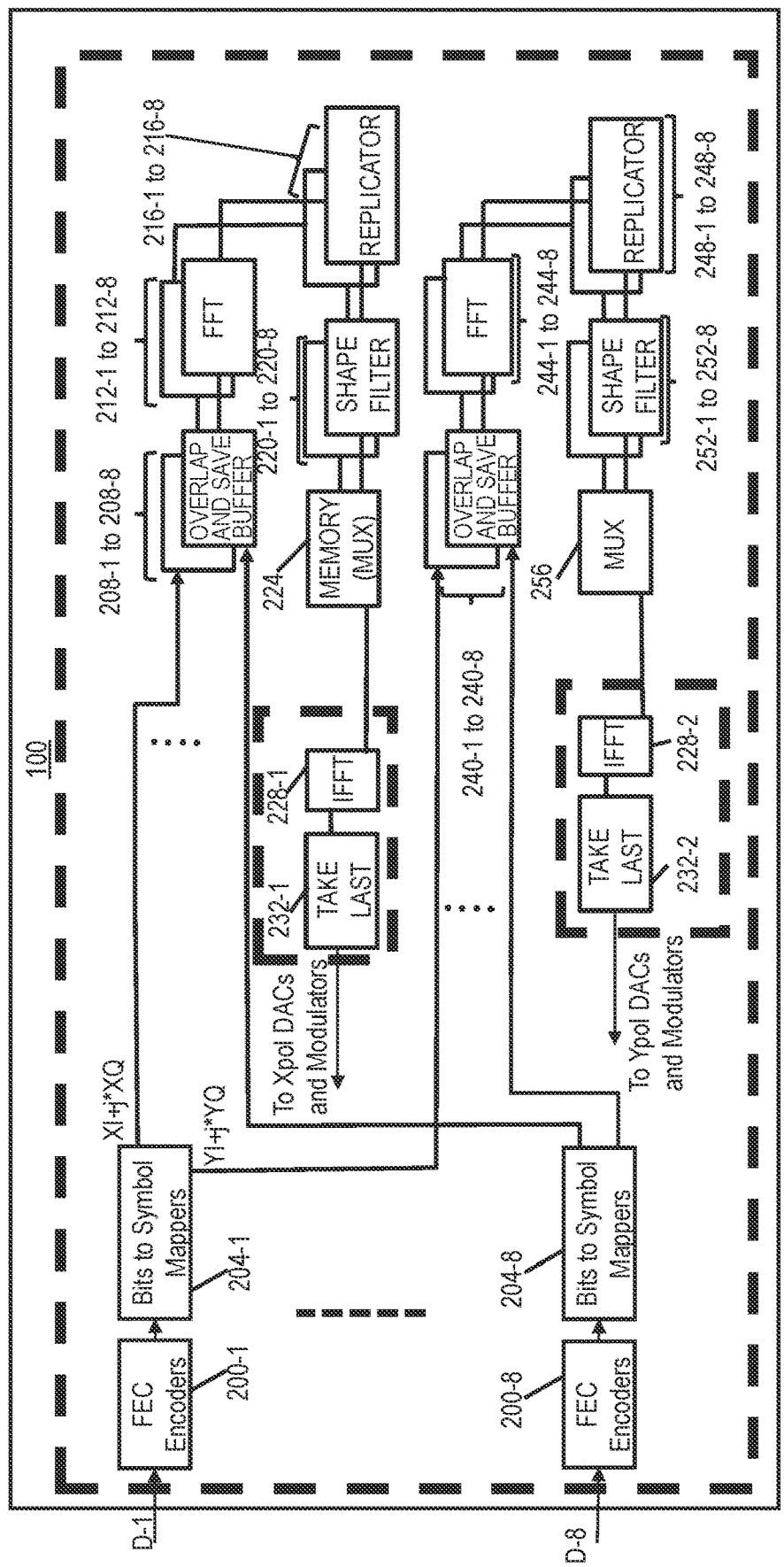
FIG. 6 is a block diagram of an exemplary embodiment of a digital signal processor (DSP) of the transmitter shown in FIG. 2 and constructed in accordance with the present disclosure.

Referring now to FIG. 6, shown therein is a block diagram of an exemplary embodiment of the DSP 100 of FIG. 4 in greater detail. As noted above, the DSP 100 receives user data streams or inputs D1 to D8. As shown in FIG. 6, each such data stream is supplied to a respective one of the forward error correction encoders (FEC encoders 200-1 to 200-8). The FEC encoders 200-1 to 200-8 carry out forward error correction coding on a corresponding one of the switch outputs, such as, by adding parity bits to the received data. The FEC encoders 200-1 to 200-8 may also provide timing skew between the subcarriers to correct for skew introduced during transmission over one or more optical fibers. In addition, the FEC encoders 200-1 to 200-8 may interleave the received data.

Each of the FEC encoders 200-1 to 200-8 provides an output to a corresponding one of multiple bits to symbol circuits, 204-1 to 204-8 (collectively referred to herein as "204"). Each of the bits to symbol circuits 204 may map the encoded bits to symbols on a complex plane. For example, the bits to symbol circuits 204 may map four bits to a symbol in a dual-polarization Quadrature Phase Shift Keying (QPSK) or an m-quadrature amplitude modulation (m-QAM, m being a positive integer) constellation, such as 8-QAM, 16-QAM, 32-QAM, 64-QAM, and 128-QAM or a greater m-quadrature amplitude modulation, or the like. Each of the bits to symbol circuits 204 provides first symbols, having the complex representation XI+j*XQ, associated with a respective one of the data input, such as D1. Data indicative of such first symbols may be carried by the X polarization component of each subcarrier SC1-SC8.

Each of the bits to symbol circuits 204 may further provide second symbols having the complex representation YI+j*YQ, also associated with a corresponding one of the data inputs D1 to D8. Data indicative of such second symbols, however, is carried by the Y polarization component of each of the subcarriers SC1-SC8.

As further shown in FIG. 6, each of the first symbols output from each of the bits to symbol circuits 204 is supplied to a respective one of first overlap and save buffers 208-1 to 208-8 (collectively referred to herein as overlap and save buffers 208) that may buffer 256 symbols, for example, however, in other embodiments, a greater or fewer number of symbols may be buffered. Each of the overlap and save buffers 208 may receive 128 of the first symbols or another number of such symbols at a time from a corresponding one of bits to symbol circuits 204. Thus, the overlap and save buffers 208 may combine 128 new symbols from the bits to symbol circuits 204, with the previous 128 symbols received from the bits-to-symbol circuits 204.

Each overlap and save buffer 208 supplies an output, which is in the time domain, to a corresponding one of the fast Fourier Transform (FFT) circuits 212-1 to 212-8 (collectively referred to as "FFTs 212"). In one example, the output includes 256 symbols or another number of symbols. Each of the FFTs 212 converts the received symbols to the frequency domain using or based on, for example, a fast Fourier transform. Each of the FFTs 212 may include 256, for example, memories or registers, also referred to as frequency bins or points, that store frequency components associated with the input symbols.

Each of the replicator components 216-1 to 216-8 may replicate the 256 frequency components associated with of the FFTs 212 and store such components in 512 or another number of frequency bins (e.g., for T/2 based filtering of the subcarrier) in a respective one of the plurality of replicator components. Such replication may increase the sample rate. In addition, replicator components 216-1 to 216-8, or circuits, may arrange or align the contents of the frequency bins to fall within the bandwidths associated with shape filter circuits 220-1 to 220-8 described below.

In one embodiment, each of the shape filter circuits 220-1 to 220-8 may apply a pulse shaping filter to the data stored in the 512 frequency bins of a respective one of the plurality of replicator components 216-1 to 216-8 to thereby provide a respective one of multiple filtered outputs, which are multiplexed and subject to an inverse FFT, as described below. The shape filter circuits 220-1 to 220-8 calculate the transitions between the symbols and the desired subcarrier spectrum so that the subcarriers can be spectrally packed together for transmission (e.g., with a close frequency separation). The shape filter circuits 220-1 to 220-8 may also be used to introduce timing skew between the subcarriers to correct for timing skew induced by links between nodes shown in FIG. 1, for example.

In one embodiment, the shape filter circuits 220-1 to 220-8 may further include a frequency domain equalizer filter, pre-compensation filter, and/or a CD filter. The shape filter circuits 220-1 to 220-8 having a frequency domain equalizer filter, pre-compensation filter, or a CD filter may be referred to as an FDEQ filter.

In one embodiment, a memory component 224, which may include a multiplexer circuit or memory, may receive the filtered outputs from the shape filter circuits 220-1 to 220-8, and multiplex or combine such outputs together to form an element vector.

The output of the memory component 224 is fed to an IFFT circuit 228-1. The IFFT circuit 228-1 may receive the element vector and provide a corresponding time domain signal or data based on an inverse fast Fourier transform (IFFT). In one example, the time domain signal may have a rate of 64 G Sample/s. A take last buffer or memory circuit 232-1 may select the last 1024 or another number of samples from an output of the IFFT circuit 228-1 and supply the samples to a downstream node at 64 G Sample's, for example.

As further shown in FIG. 6, each of the bits to symbol circuits 204-1 to 204-8 outputs a corresponding one of symbols indicative of data carried by the Y polarization component of the polarization multiplexed modulated optical signal output on the optical communication path or optical fiber 140. As further noted above, these symbols may have the complex representation YI+j*YQ. Each such symbol may be processed by a respective one of the overlap and save buffers 240-1 to 240-8, a respective one of the FFT circuits 244-1 to 244-8, a respective one of the replicator components or circuits 248-1 to 248-8, the shape filter circuits 252-1 to 252-8, and the multiplexer or memory 256. Moreover, the output of the multiplexer or memory 256 may be fed to a IFFT 228-2, and a take last buffer or memory circuit 232-2, to provide processed symbols having the representation YI+j*YQ in a manner similar to or the same as that discussed above in generating processed symbols XI+j*XQ output from the memory circuit 232-1. In addition, symbol components YI and YQ are provided to the downstream node.

While FIG. 6 shows the DSP 100 as including a particular quantity and arrangement of functional components, in some implementations, the DSP 100 may include additional functional components, fewer functional components, different functional components, or differently arranged functional components. In addition, typically the number of overlap and save buffers, FFTs, replicator circuits, and pulse shape filters associated with the X component may be equal to the number of data inputs, and the number of such circuits associated with the Y component may also be equal to the number of switch outputs. However, in other examples, the number of data inputs may be different than the number of these circuits. As noted above, based on the outputs of the MZMDs 116-1 to 116-4, multiple optical subcarriers SC1 to SC8 may be output onto the optical fiber 140.

Referring now to FIG. 7, shown therein is a diagram of an exemplary embodiment of a shared laser constructed in accordance with the present disclosure. In this embodiment, the laser 124 is provided that is "shared" between the transmitter 70 and the receiver 74 in the primary transceivers 22 or between the receiver 78 and the transmitter 82 of the secondary transceiver 34. For example, a splitter 380 can provide a first portion of light output from the laser 124 to the MZMs 120 in the transmitter portion of the transmitter 70. Further, the splitter 380 can provide a second portion of such light acting as a local oscillator signal fed to 90-degree optical hybrids in the receiver 74 of the transmitter 70.

Figure 8:
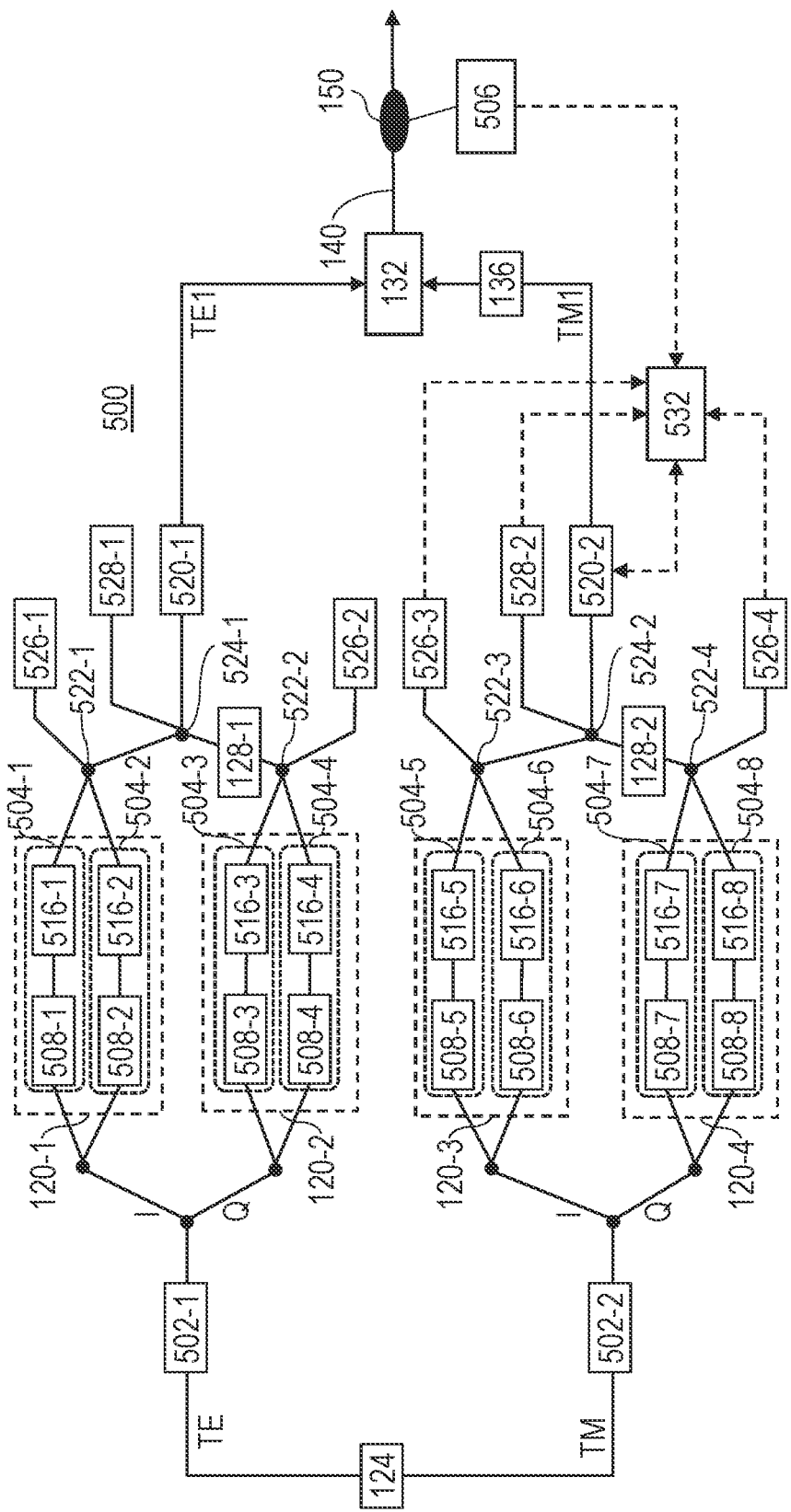
FIG. 8 is an exemplary embodiment of the optics block of the transmitter of FIG. 4 constructed in accordance with the present disclosure.

Referring now to FIG. 8, shown therein is a block diagram of an exemplary embodiment of an optics block 500 constructed in accordance with the present disclosure. The optics block 500, similar to the D/A and optics block 112 described above in FIG. 4, generally includes the laser 124 where a light beam output from the laser 124 is split such that a first portion of the light is supplied to a first MZM pairing including the MZMs 120-1 and 120-2 and a second portion of the light is supplied to a second MZM pairing including the MZMs 120-3 and 120-4. The optics block 500 shown in FIG. 8 describes an optics block for a single channel, for example channel 1.

In one embodiment, the light beam output from the laser 124 may pass through a SOA 502 disposed between the laser 124 and the MZMs 120. For example, the light beam output from the laser 124 may pass through, and be amplified by, the SOA 502-1 before the light beam is received by the MZM 120-1 and the MZM 120-2. Similarly, the light beam output from the laser 124 may pass through, and be amplified by, the SOA 502-2 before the light beam is received by the MZM 120-3 and the MZM 120-4.

The first portion of the light is further split into third and fourth portions, such that the third portion is modulated by the MZM 120-1 to provide an in-phase (I) component of an X (or TE) polarization component of a modulated optical signal, and the fourth portion is modulated by the MZM 120-2 and in order to provide a quadrature (Q) component of the X polarization component of the modulated optical signal. The MZM 120-1 includes an MZM arm 504-1 and an MZM arm 504-2, both of which receive the third portion of the light, and the MZM 120-2 includes an MZM arm 504-3 and an MZM arm 504-4, both of which receive the fourth portion of the light.

In one embodiment, each MZM arm 504 includes a high-speed phase modulator 508 driven by MZMD and a phase adjuster 516 such that, for example, the MZM arm 504-1 includes high-speed phase modulator 508-1 and phase adjuster 516-1. In some embodiments, output of each MZM arm 504 of a particular MZM 120 passes through an optical combiner 522. For example, output of the MZM arm 504-1 and the MZM arm 504-2 are combined by an optical combiner 522-1 to form an output of the MZM 120-1 and output of the MZM arm 504-3 and the MZM arm 504-4 are combined by an optical combiner 522-2 to form an output of the MZM 120-2.

Similarly, the second portion of the light is further split into fifth and sixth portions, such that the fifth portion is modulated by the MZM 120-3 to provide an I component of a Y (or TM) polarization component of the modulated optical signal, and the sixth portion is modulated by the MZM 120-4 to provide a Q component of the Y polarization component of the modulated optical signal. As previously discussed, in some embodiments, output of each MZM arm 504 of a particular MZM 120 passes through an optical combiner 522. For example, output of the MZM arm 504-5 and the MZM arm 504-6 are combined by an optical combiner 522-3 to form an output of the MZM 120-3 and output of the MZM arm 504-7 and the MZM arm 504-8 are combined by an optical combiner 522-4 to form an output of the MZM 120-4.

In one embodiment, each of the optical combiners 522 may route a portion of the combined light to a monitor photodetector (MON) 526 operable to detect a power of the optical signal passing through the optical combiner 522 on a complementary path of a particular MZM 120. The MON 526 is a photodetector operable to detect a power of an optical signal, e.g., as a current. For example, as shown in FIG. 8, the output of the optical combiner 522-1 may be detected by the MON 526-1, the output of the optical combiner 522-2 may be detected by the MON 526-2, the output of the optical combiner 522-3 may be detected by the MON 526-3, and the output of the optical combiner 522-4 may be detected by the MON 526-4.

The optical output of the MZM 120-2 passes through the 90-degree phase shifter 128-1 and is combined with the optical output of the MZM 120-1 to provide an X polarized optical signal (TE1) including I and Q components and fed to a polarization beam combiner (PBC 132) provided in the optics block 112. In addition, the optical output of the MZM 120-4 passes through the 90-degree phase shifter 128-2 and is combined with the optical output of the MZM 120-3 to provide a Y polarized optical signal (TM1). After passing through a polarization rotator 136, the Y polarized optical signal TM1 is also provided to PBC 132, which combines the X and Y polarized modulated optical signals to provide a polarization multiplexed ("dual-pol") modulated optical signal onto an optical fiber 140. In some examples, the optical fiber 140 may be included as a segment of optical fiber in an example optical communication path of the optical communication system 10.

In one embodiment, the optical output of the MZM 120-2 may pass through an IQ balancing VOA before combining with the optical output of the MZM 120-1. The IQ balancing VOA may be disposed before or after the phase shifter 128-1. Similarly, the optical output of the MZM 120-4 may pass through an IQ balancing VOA before combining with the optical output of the MZM 120-3. The IQ balancing VOA may be disposed before or after the phase shifter 128-2.

In one embodiment, the modulated optical signal may be split by a splitter or optical tap such as optical tap 150 which splits a portion of the modulated optical signal to an MPD 506. The MPD 506 is a module monitoring photodetector operable to determine an output power for the optics block 500. In one embodiment, the MPD 506 is operable to monitor the output power of the transmitter 70.

As discussed above, each MZM arm 504 includes the high-speed phase modulators 508 and the phase adjuster 516. The high-speed phase modulator 508, shown in FIG. 8 as 508-1 to 508-8, generates phase modulation on the optical signal proportional to an RF signal having a data. The RF signal is modulated onto the portion of light from the laser 124 passing through the MZM arm 504 to carry the data.

In one embodiment, X polarized optical signal (TE1) passes through a SOA 520-1. The SOA 520-1 is a semiconductor optical amplifier operable to amplify, or increase the gain of, the X polarized optical signal (TE1). In one embodiment, the SOA 520-1 may be operated with a reverse bias to determine a X-Pol power of the X polarized optical signal (TE1).

In one embodiment, the X polarized optical signal (TE1) may pass through a 2×2 optical combiner 524-1 where a first portion of the X polarized optical signal (TE1) continues on to the PBC 132, or optionally through the SOA 520-1 as discussed above, and a second portion of the X polarized optical signal (TE1) continues to a CPD 528-1. The X-pol CPD 528-1 is a complementary path photodetector operable to determine the X-Pol power of the X polarized optical signal (TE1). In one embodiment, the CPD 528-1 measures the X-Pol power before the X polarized optical signal (TE1) passes through the SOA 520-1.

In one embodiment, Y polarized optical signal (TM1) passes through a SOA 520-2. The SOA 520-2 is a semiconductor optical amplifier operable to amplify, or increase the gain of, the Y polarized optical signal (TM1). In one embodiment, the SOA 520-2 may be operated with a reverse bias to determine a Y-Pol power of the Y polarized optical signal (TM1).

In one embodiment, the Y polarized optical signal (TM1) may pass through a 2×2 optical combiner 524-2 where a first portion of the Y polarized optical signal (TM1) continues on to the PBC 132, or optionally through the SOA 520-2 as discussed above, and a second portion of the Y polarized optical signal (TM1) continues to a CPD 528-2. The Y-pol CPD 528-2 is a complementary path photodetector operable to determine the Y-Pol power of the Y polarized optical signal (TM1). In one embodiment, the CPD 528-2 measures the Y-Pol power before the Y polarized optical signal (TM1) passes through the SOA 520-2.

As shown in FIG. 8, in one embodiment, the optics block 500 further includes a control and monitoring circuitry 532. The control and monitoring circuitry 532 is in communication with the CPDs 528-1, 528-2, the MPD 506 and the SOA 520-1, 5200-2, of the optics block 500. The control and monitoring circuitry 532 may include a processor, which may be an ASIC, FPGA, microprocessor, or other processor associated with the transmitter 70. The control and monitoring circuitry 532 may also include an analog-digital converter in communication with each of the CPDs 528-1, 528-2, SOAs 520-1, 520-2, and MPD 506 (when present) and operable to convert an analog output from one of more of the CPDs 528-1, 528-2, SOAs 520-1, 520-2, and MPD 506 into a digital signal indicative of a power measured by the CPDs 528-1, 528-2, SOAs 520-1, 520-2, and MPD 506 respectively.

In one embodiment, when the MONs 526 are present, the control and monitoring circuitry 532 is further operable to communicate with each of the MONs 526-1 to 526-4. The analog-digital converter(s) of the control and monitoring circuitry 532 may further be in communication with each of the MONs 526-1 to 526-4 and operable to convert an analog output from one of more of the MONs 526-1 to 526-4 into a digital signal indicative of a power measured by the MONs 526-1 to 526-4.

While FIG. 8 shows the optics block 500 as including a particular quantity and arrangement of functional components, in some implementations, the optics block 500 may include additional functional components, fewer functional components, different functional components, or differently arranged functional components.

Figure 9:
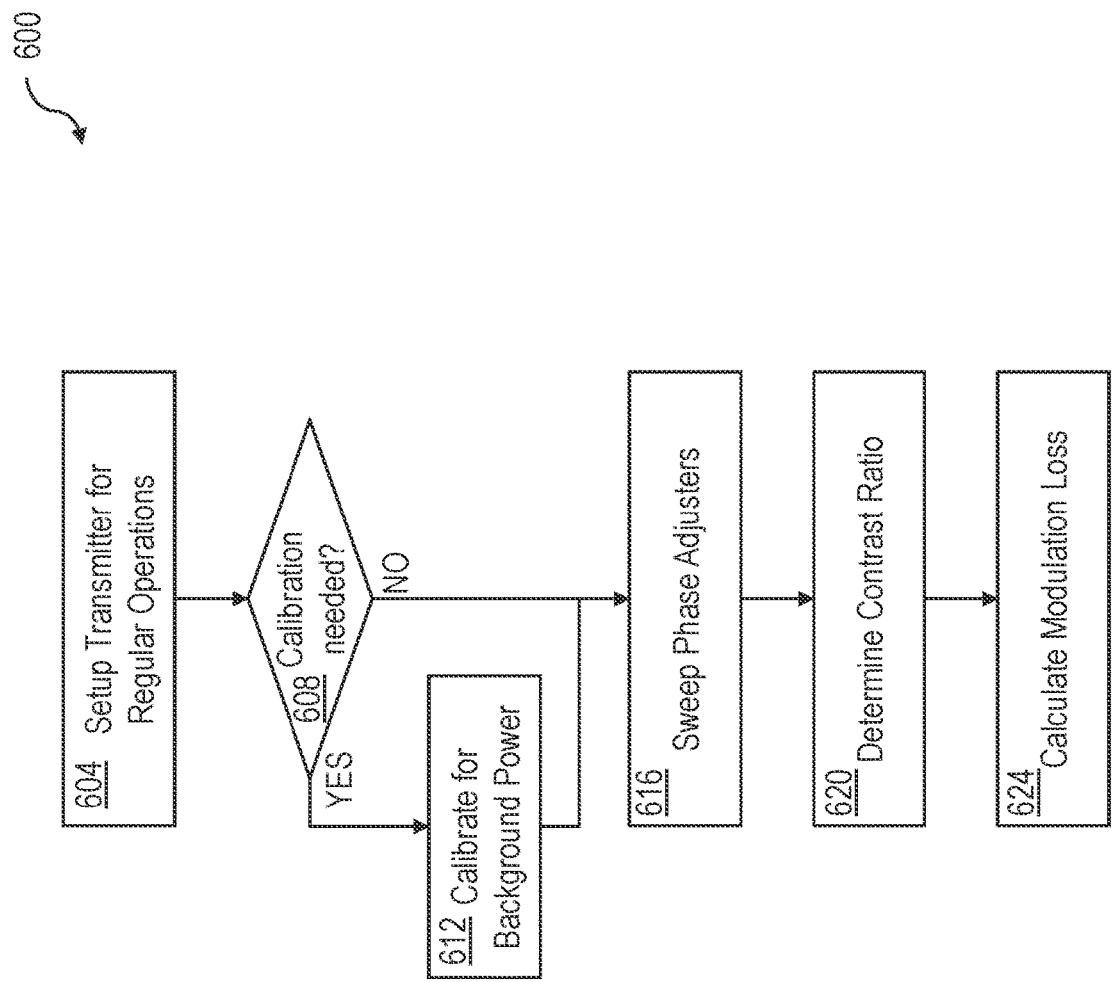
FIG. 9 is a process flow diagram of an exemplary embodiment of a modulation loss measurement process in accordance with the present disclosure.

Referring now to FIG. 9, shown therein is a process flow diagram of an exemplary embodiment of a modulation loss measurement process 600 in accordance with the present disclosure. The modulation loss measurement process 600 generally includes the steps of: setting up the transmitter for regular operations (step 604); determining if calibration is needed (step 608); if calibration is needed, calibrating for background power of a power measurement device (step 612); if calibration is not needed, continuing to differentially sweep phase adjusters (step 616); determine contrast ratio (step 620); and calculating modulation loss (step 624). In one embodiment, the modulation loss measurement process 600 is performed for each path TEI, TEQ, TMI, and TMQ.

In one embodiment, the modulation loss measurement process 600 is performed without prior knowledge of the operating characteristics of the components of the transmitter 70 such as knowledge of the signal histogram, power density function of the drive signal, voltage swing, high-speed phase modulator 508 Vpi value (the voltage required to modulate a 180 degree, or $\pi$, phase shift), or the like. In one embodiment, the modulation loss measurement process 600 is performed while the transmitter 70 is not transmitting data, e.g., user data. In one embodiment, the modulation loss measurement process 600 is performed at the bring-up step, that is, when the transmitter 70 is being prepared to transmit user data.

In one embodiment, setting up the transmitter for regular operations (step 604) includes powering up the transmitter, e.g., the transmitter 70. Setting up the transmitter for regular operations (step 604) may include the steps of powering up components of the transmitter 70; applying known good operating points (KGOP) on components of the MZMs 120; applying a desired RF input to MZMD streams using the DAC 108; and applying desired MZMD 116 gains.

In one embodiment, powering up components of the transmitter 70 may include powering up and tuning components such as the laser(s) 124, the MZMs 120, the MZMDs 116, the DSP 100, the DAC 108, the SOAs 520-1 and 520-2 and other components of the D/A and optics block 112 or optics block 500, and/or the module 148. In one embodiment setting up the transmitter for regular operations includes turning on any transmitter control loops, e.g., MZM bias control, power control, laser control, and letting the control loops converge to optimal settings.

In one embodiment, applying KGOP on components of the MZMs 120 includes applying known good operating points to each of the high-speed phase modulator 508 and the phase adjuster 516 for each arm of each path (I, Q) of each component (X, Y). Known good operating points include parameters and settings for each component, e.g., the high-speed phase modulators 508, the VOAs 512, the phase adjusters 516, at which the particular component is known to operate. In one embodiment, the KGOP for each component is a known optimum setting, e.g., a setting at which the component operates at or near peak performance, either alone or in combination with other components.

In one embodiment, applying the desired RF input to the MZMD streams using the DAC 108 includes applying of an RF signal to one or more of the high-speed phase modulators 508-1 to 508-8. The RF signal applied may be determined at least in part on a desired modulation of the optical signal when the transmitter 70 is in operation. The RF signal may be one of a dual-polarization Quadrature Phase Shift Keying (QPSK) or an m-quadrature amplitude modulation (m-QAM, m being a positive integer) constellation, such as 8-QAM, 16-QAM, 32-QAM, 64-QAM, and 128-QAM or a greater m-quadrature amplitude modulation, or some combination thereof, for example. In one embodiment, KGOP are known for one or more modulation of the RF signal. In one embodiment, the desired RF input may include test data to simulate an RF signal as provided during normal operations.

In one embodiment, applying desired MZMD gains includes tuning one or more amplifier before each high-speed phase modulator 508. The MZMD gains may be settings for each amplifier before the high-speed phase modulator 508 to amplify each portion of RF signal modulating the optical signal through the respective MZM 120 or the respective MZM arm 504.

In one embodiment, determining if calibration is needed (step 608) may include determining whether a calibration has been previously performed. For example, if the calibration has not been previously performed, values, such as a dark current, background current or leaking current may be unknown. In one embodiment, determining if calibration is needed (step 608) may include determining a time period since the last calibration was performed. A calibration may be performed after a predetermined period of time, after a predetermined communication data rate has been reached, after a certain quantity of data has been transmitted, every time the transmitter 70, primary transceiver 22, or primary node 14 is booted up, or the like, for example. Other triggers or thresholds for determining whether a calibration should be performed may also be contemplated and implemented as part of determining if calibration is needed (step 608).

If calibration is needed, the modulation loss measurement process 600 continues to calibrate for background power (step 612) of a power measurement device, e.g., one or more of the CPD 528, MON 526, MPD 506, or SOA 520 in reverse bias, or some combination thereof. In one embodiment, calibrating for background power may include calibrating for dark current and/or leaking current, of the CPD 528, MON 526, MPD 506, or SOA 520 in reverse bias.

In one embodiment, calibrating for background power (step 612) includes turning off RF input and measuring background power (dark current and/or leaking current). In some embodiments, after turning off RF input, the phase adjuster 516 may need to be adjusted from the KGOP values to ensure that the phase adjuster 516 is re-adjusted to Null operating point.

In one embodiment, calibrating for background power (step 612) may further include measuring a NULL background power for each MZM 120. If a photodetector is available after each MZM 120, measuring the NULL background power may be performed by measuring a power detected by the photodetector. If either the CPD 528 or MON 526 is provided in the optics block 500, measuring the NULL background power for a particular CPD 528 or MON 526 may be performed by measuring a background power from the CPD 528 or MON 526 when the RF input is turned off for each MZM 120 in optical communication with the particular CPD 528 or MON 526. Use of the CPDs 528 or MONs 526 may be beneficial when compared to use of the SOAs 520 because the CPDs 528 or MONs 526 allow monitoring of the output signal from each MZM 120 without impacting the thermal state, for example, of the transmitter 70. In one embodiment, utilization the CPDs 528 or the MONs 526 may be beneficial when compared to utilization of any photodetector that may be in the optics block 500 after the SOA 520 due to insensitivity of the CPD 528 or the MON 526 measurements to SOA 520 compression, which otherwise exists at high power measurements when the SOA 520 is saturated.

In one embodiment, if no CPD 528 or MON 526 is provided in the optics block 500, measuring the NULL background power may be performed by reverse biasing the SOA 520 to determine the NULL background power. The NULL background power is the power of the components of each MZM 120 when no data is modulated on the signal. Once the NULL background power has been determined, calibrating for the NULL background power (step 612) may turn the RF input back on, e.g., increase the gain of the amplifiers to a power level before step 612, to a power level determined by the KGOP, or the like. Determining the NULL background power may be more important for higher modulation loss measurements.

The NULL background power may include PD dark current, leaked power, unmodulated laser 124 power, etc. In one embodiment, the MZM extinction ratio is assumed to be infinite.

In one embodiment, the NULL background power (also called NULL power, background current, background power, etc.) may be stored in a memory once the NULL background power has been determined. For example, the NULL background power may be stored in the memory 224, the DSP 100, in memory 544, in a flash memory on the module, in another component of the primary node 14, and/or the like.

In one embodiment, calibrating for background power (step 612) is performed by the manufacturer during the manufacturing process. In another embodiment, calibrating for background power (step 612) is performed when the transmitter 70 is installed in the primary transceiver 22, when the primary transceiver 22 is installed in the primary node 14, when the primary node 14 is installed in the optical communication system 10, or some combination thereof. In other embodiments, calibrating for background power (step 612) may be performed as dictated by determining whether calibration is needed (step 608).

If calibration is not needed, the modulation loss measurement process 600 continues to sweep the phase adjusters (step 616) to determine a NULL RF power and a PEAK RF power in the presence of RF signal.

In one embodiment, sweeping the phase adjusters (step 616) includes differentially sweeping, for each MZM 120, the phase adjuster 516 of a first arm 504 from a first phase (PA1) to a second phase and the phase adjuster 516 of a second arm 504 from an opposite of the first phase (PA2) to an opposite of the second phase. In this manner, the differential phase (dP) is dP=PA1-PA2, such that, for example, if the phase adjuster 516 of the first arm is set to −90 degrees, then the phase adjuster 516 of the second arm is set to 90 degrees resulting in dP=−90−90=−180 degrees. In one embodiment, each phase adjuster 516 has to have a 90-degree range of adjustability.

In one embodiment, sweeping the phase adjusters (step 616) may include differentially sweeping, for each MZM 120, the phase adjuster 516 of a first arm 504 from a first phase (PA1) to a second phase and the phase adjuster 516 of a second arm 504 from an opposite of the first phase (PA2) to an opposite of the second phase by stepping the first phase in increments of between about 5 degrees to about 90 degrees. For example, the first phase (PA1) may be selected to be −90 degrees at a first point in time and, having a step of 5 degrees, the first phase (PA1) is selected to be −85 degrees at a second point in time different from the first point in time.

In one embodiment, the first phase offset of 0 deg is applied to the KGOP of the phase adjusters 516 of both arms. Next, the second phase offset of 90 deg is applied to the KGOP of the phase adjuster of the first arm and phase offset of −90 deg is applied to the KGOP of the phase adjuster of the second arm. For example, sweeping the phase adjusters (step 616) performed for the MZM 120-1 may include sweeping the phase adjuster 516-1 from a known good operating parameter, for example, 5 degrees, to 95 degrees (90 degrees plus the KGOP of 5 degrees) while sweeping the phase adjuster 516-2 from a known good operating parameter, for example, 10 degrees, to −80 degrees (−90 degrees plus the KGOP of 10 degrees).

In another embodiment, sweeping the phase adjusters (step 616) includes sweeping, for each MZM 120, the phase adjuster 516 of a first arm 504 from a first phase to a second phase while the phase adjuster 516 of the second arm 504 is held at a fixed phase. In one embodiment, each of the first phase and the second phase is offset by the KGOP of the phase adjuster 516 being swept. In one embodiment, the first phase is 0 deg and the second phase is 180 deg. For example, sweeping the phase adjusters (step 616) performed for the MZM 120-1 may include sweeping the phase adjuster 516-1 from 0 deg and a known good operating point, for example, 5 degrees, to 180 deg while keeping the phase adjuster 516-2 at a fixed phase, for example, 10 degrees. In the above example, alternatively, the phase adjuster 516-2 may be swept from the first phase to the second phase while the phase adjuster 516-1 is kept at a fixed phase. In this embodiment, however, holding one MZM arm 504 fixed causes a change in thermal profile of the MZM 120 which impacts effectiveness of the KGOP of each MZM arm 504 and this embodiment requires sweeping of twice the phase range as the differential sweep discussed above. In one embodiment, each phase adjuster 516 has to have a 180-degree range of adjustability, or twice the range of adjustability as a phase adjuster 516 when implementing differential sweeping as described above.

In one embodiment, sweeping the phase adjusters (step 616) includes sweeping the phase adjusters 516 differentially to measure a power (or current) from the CPD 528 for each MZM 120 to determine the NULL RF power and the PEAK RF power. In another embodiment, sweeping the phase adjusters (step 616) to determine the NULL RF power and the PEAK RF power may include sweeping the phase adjusters 516 differentially to measure a power (or current) from the SOAs 520 when the SOAs 520 are reverse biased. In another embodiment, sweeping the phase adjusters (step 616) to determine the NULL RF power and the PEAK RF power may include sweeping the phase adjusters 516 differentially to measure a power (or current) from the MONs 526-1 to 526-4.

In one embodiment, when the MONs 526 are present, sweeping the phase adjusters (step 616) can be performed simultaneously, or nearly simultaneously, for each of paths TEI, TEQ, TMI, and TMQ when utilizing the MONs 526. In one embodiment, sweeping the phase adjusters (step 616), when utilizing the CPDs 528-1 and 528-2, or when utilizing the SOAs 520-1 and 520-2 in reverse bias, sweeping the TE/TM paths can be performed simultaneously, or nearly simultaneously, while sweeping of each path I, Q is performed sequentially. For example, sweeping TEI can be performed simultaneously, or nearly simultaneously, while sweeping either TMI or TMQ, and sweeping TEQ can be performed simultaneously, or nearly simultaneously, while sweeping TMI or TMQ, however, sweeping TEI and TEQ is performed sequentially and sweeping TMI and TMQ is performed sequentially.

In one embodiment, the CPD 528-1 and the CPD 528-2 have a sensitivity and operation range that meets or exceeds the contrast ratio range. Additionally, as long as relative power readings from the CPD 528-1 and 528-2 are correct, a difference between the PEAK RF power and the NULL RF power can be determined.

In one embodiment, the SOA 520-1 and the SOA 520-2 have a sensitivity and operation range that meets or exceeds the contrast ratio range. Additionally, as long as relative power readings from the SOA 520-1 and 520-2 are correct, a difference between the PEAK RF power and the NULL RF power can be determined.

Similarly, in one embodiment, the MON 526-1 to 526-4 have a sensitivity and operation range that meets or exceeds the contrast ratio range. Additionally, as long as relative power readings from the MON 526-1 to 526-4 are correct, a difference between the PEAK RF power and the NULL RF power can be determined.

In one embodiment, a relative phase difference (dP) is applied to the MZM arms 504 of each MZM 120 is used to determine a power difference, that is, the difference in phase adjuster setting between both MZM arms 504 of a particular MZM 120. For example, the MZM arm 504-1 may be set to a first phase and an opposite phase to the first phase may be applied to the MZM arm 504-2 to determine the power difference in the phase adjuster settings between the MZM arm 504-1 and the MZM arm 504-2 of the MZM 120-1. This process may be repeated for each of the MZM 120-1 to 120-4.

Figure 10:
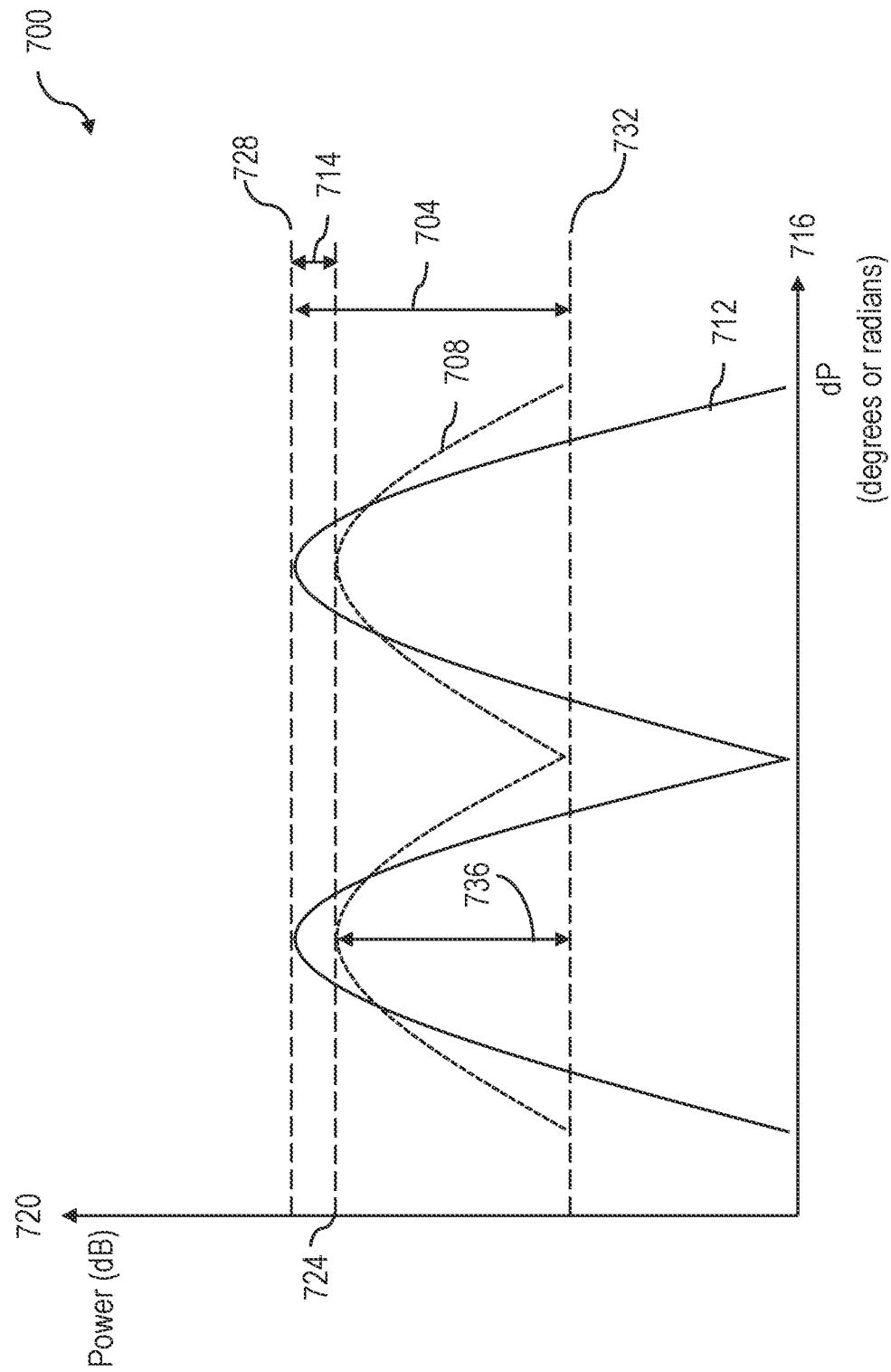
FIG. 10 is a graph showing an exemplary embodiment of a modulator phase scan in accordance with the present disclosure.
Figure 11:
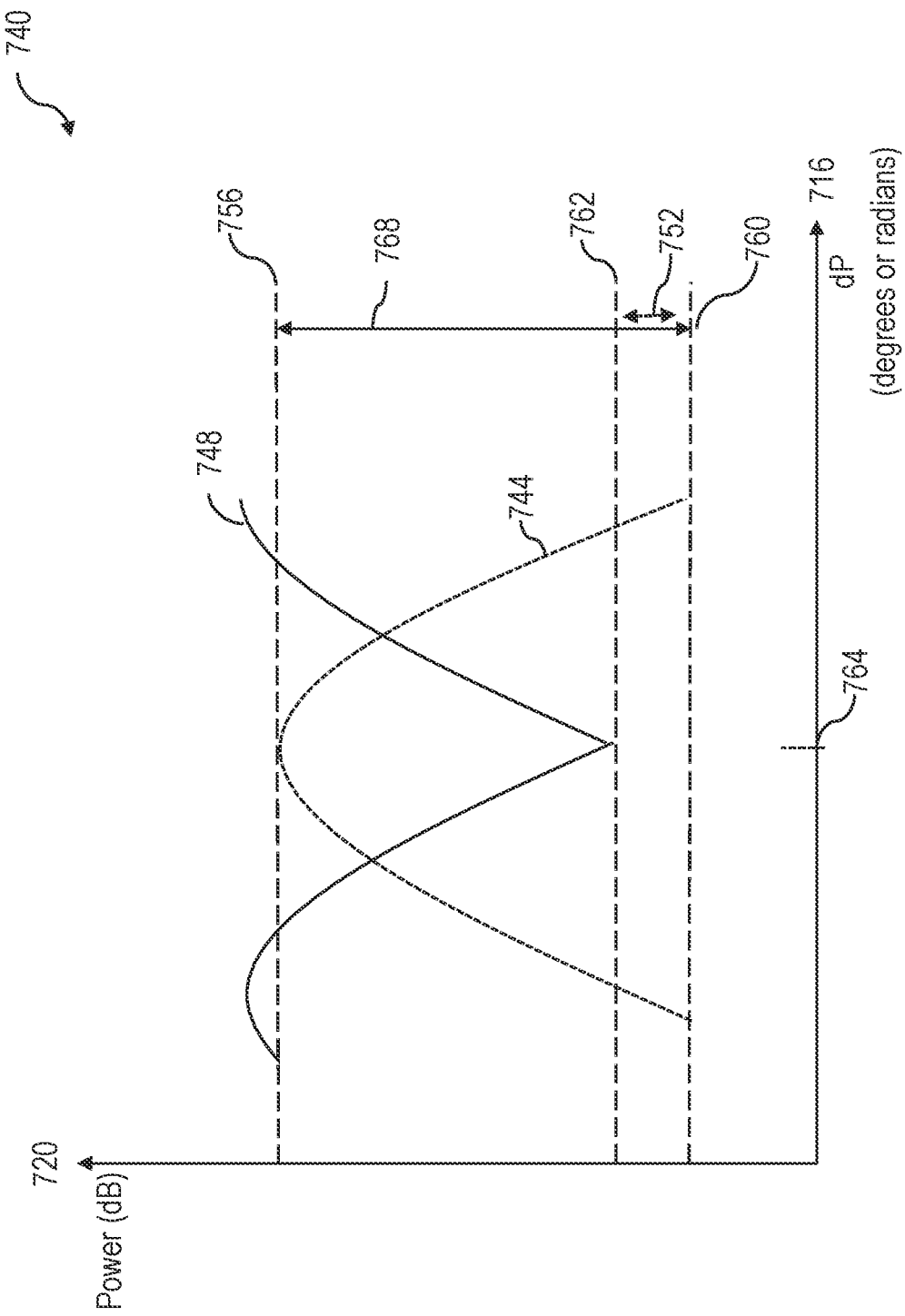
FIG. 11 is a graph showing an exemplary embodiment of a CPD and MPD power measurement in accordance with the present disclosure.

In one embodiment, sweeping the phase adjusters (step 616) may include fitting the measured power to a known cosine waveform shape to reduce noise in measurements of the NULL power and PEAK power as shown in FIG. 10 and FIG. 11, below.

In one embodiment, determining the contrast ratio (step 620) includes computing the contrast ratio by finding the difference between the NULL RF power and the PEAK power in decibels, as shown below in FIG. 10. In other embodiments, determining the contrast ratio (step 620) includes dividing the PEAK power by the NULL RF power in linear domain.

In one embodiment, determining the contrast ratio (step 620) further includes subtracting NULL background power from the PEAK power and/or subtracting NULL background power from any power measurement during the RF sweep, especially the NULL RF power. In some embodiments, the NULL background power of the detector is only removed from the NULL RF power and not removed from the PEAK power, for example, if the impact is insignificant, i.e., if the NULL background power is much smaller than the PEAK power.

In one embodiment, calculating modulation loss (step 624) assumes that the drive signal $V_{RF}(t)$ is an ergodic random process, resulting in time-averaged power equal to the ensemble average of the random process, the MZM extinction ratio>>1, that is, the MZM extinction ratio is much greater than 1 and may be greater than 10 dB, the RF signal averages zero (0), $E\{V_{RF}(t)\}=0$, where the DC bias can be adjusted, for example, by the placing the phase adjuster 516 at KGOP, and $$E\left\{\cos\left(\frac{\pi V_{RF}(t)}{V_\pi}\right)\right\}$$

is finite. Under these assumptions, the modulation loss can be calculated from the contrast ratio by solving the following equation $$CR_{dB} \simeq ML_{dB} + 10\log_{10}\left(1 - 10^{\frac{-ML_{dB}}{10}}\right), \quad \text{(Equation 1)}$$

for $ML_{dB}$. In this equation both ML and CR have units reported in decibels, that is: $ML_{dB}=10 \log_{10} ML$.

In one embodiment, the modulation loss measurement process 600 is performed by the control and monitoring circuitry 532 in communication with the components, e.g., the CPDs 528-1, 528-2, the MONs 526-1 to 526-4, the MPD 506 and the SOA 520-1, 520-2, of the optics block 500. The control and monitoring circuitry 532 may include a processor, which may be an ASIC, FPGA, microprocessor, or other processor associated with the transmitter 70. In one embodiment, the control and monitoring circuitry 532 is implemented on and/or integrated with the transmitter 70. In another embodiment, the control and monitoring circuitry 532 is integrated with the primary transceiver 22. In one embodiment, the control and monitoring circuitry 532 is different from the DSP 100. In one embodiment, the modulation loss measurement process 600 is performed by the central software 38.

In one embodiment, the modulation loss measurement process 600 can be performed in situ, that is, the modulation loss measurement process 600 can be performed during operation of the transmitter 70 as shown in FIG. 11 below.

In this embodiment, the optics block 500 may include the MPD 506, where the MPD 506 is operable to determine an operating power of the optics block 500 for both TE and TM for all paths (I, Q), and/or may include the CPDs 528-1 and 528-2. In other embodiments, the SOAs 520 may be used to determine an operating power of the optics block 500 for a particular path TE, TM. In these embodiments where the modulation loss measurement process 600 is performed in situ, sweeping the phase adjusters (step 616) may be omitted from the modulation loss measurement process 600. Here, a minimum power at the operating point 764, is used to derive the minimum power 762 if the CPD 528 is calibrated. Alternatively, minimum power measurement 762 can be made using the MPD 506. As shown in FIG. 11 and discussed below, the power detected at the CPD 528 or MPD 506 is indicated at the minimum power 762 before calibration and the power detected at the MONs 526 is indicated at the maximum power 756.

In this embodiment, calibrating for background power (step 612) may further include calibrating the relative power between the MONs 526 and the CPD 528, to account for a change in Null RF power due to various component losses in components between the MONs 526 and the CPD 528. After this calibration, the NULL RF power detected at the CPD 528 can be adjusted based on the calibration to derive the NULL RF power of the MON 526. As previously discussed, calibrating for background power (step 612) may be performed by the manufacturer of the transmitter 70 and may be performed by the manufacturer or at the time of installation or at other times as discussed above. The contrast ratio is thus defined as the difference between the derived NULL RF power at the CPD 528 and the PEAK RF power measured by the MON 526. Additionally, in this embodiment, the NULL RF power detected at the CPD 528 is not affected by gain compression of the SOA 520 because the measurement is prior to SOA 520.

In one embodiment, the derived minimum CPD power may be the power measured by the MPD 506. However, this embodiment would require a different calibration term between MPD 506 and MON 526 to account for SOA amplification and other component losses between the two MPD 506 and the MON 526. Additionally, in this embodiment, the NULL RF power detected at the MON 506 is not affected by gain compression of the SOA 520 as the gain compression is relatively low and will not saturate the SOA 520.

In one embodiment, the modulation loss is utilized to determine performance of the transmitter 70 and/or the primary transceiver 22, such as an optical signal to noise ratio (TOSNR). In some embodiments, the modulation loss is utilized to determine a maximum reach of the transmitter 70, e.g., a maximum distance within the optical communication system 10 for which the transmitter 70 can transmit the optical signal and the secondary node 18 can recover the data transmitted on the optical signal, and/or a maximum data transmission speed or modulation type of the transmitter 70, e.g., over a particular distance.

In some embodiments, the modulation loss can be used as an indicator for determining when the transmitter 70 or primary transceiver 22 of the primary node 14 should be replaced or repaired.

In one embodiment, the control and monitoring circuitry 532 may adjust one or more KGOP of one or more component of the transmitter 70, e.g., of the D/A and Optics block 112 or the DSP 100, based on the modulation loss determined by the modulation loss measurement process 600 to ensure the modulation loss of the transmitter is maintained within an upper threshold and a lower threshold. The upper threshold and the lower threshold may be provided in firmware, software, e.g., the central software 38, by the user, or determined by a particular application of the transmitter 70 during operation.

In one embodiment, the modulation loss measurement process 600 may be performed when a device, e.g., the transmitter 70, is installed to ensure that the modulation loss of the device, e.g., transmitter 70, is within the upper threshold and lower threshold as identified by the manufacturer.

In one embodiment, the modulation loss measurement process 600 is performed to determine one or more correction, such as a gain adjustment for a particular path TEI, TEQ, TMI, or TMQ, required to compensate for temperature changes or aging of a device, e.g., the transmitter 70.

Referring back to the drawings, and in particular to FIG. 10, shown therein is an exemplary embodiment of a simulated graph 700 of modulation loss 704 determined between an RF scan 708, when the RF signal is applied to the MZM 120, and a DC scan 712, where the RF signal is not applied ($V_{RF}=0$). The graph 700 further includes an X-axis 716 depicting differential phase (dP), that is, the difference in phase between the phase adjuster 516 of each MZM arm 504 within a particular MZM 120, and a Y-axis 720 depicting the power of the optical signal at the output of the particular MZM 120, e.g., as measured by one of the CPD 528, the SOA 520, or the MON 526. The differential phase (dP) may be determined, for the MZM 120-1, for example, by the relative phase of the MZM arm 504-1 to the MZM arm 504-2.

As shown in FIG. 10, when the RF signal is applied, there is a reduced range 714 as determined by comparing the range of the DC scan 712 and the RF scan 708. As a height of each scan is a power in dB, as indicated by the Y-axis 720, a maximum power 724 of the RF scan 708 is lesser than a maximum power 728 of the DC scan 712. A contrast ratio 736, is defined as the difference between the maximum power 724 of the RF scan 708 (PEAK RF power) and the minimum power 732 of the RF scan 708 (NULL RF power). The modulation loss 704 is a power difference between the maximum power 728 of the DC scan 712 (PEAK DC power) and a minimum power 732 of the RF scan 708 (NULL RF power).

As described in more detail above, the modulation loss measurement process 600 may be performed with an RF scan 708 only, that is, the modulation loss measurement process 600 is performed with the RF signal applied to each MZM 120. In one embodiment, the RF signal applied during the modulation loss measurement process 600 may be a test RF signal selected to mimic an RF signal during actual operation of the transmitter 70. In another embodiment, the phase adjusters of the MZM may be a sweep from a first differential phase to a second differential phase, e.g., from −0 to 180 degrees, or larger range. By performing only an RF sweep, the modulation loss measurement process 600 may be accelerated, i.e., a duration of performing the modulation loss measurement process 600 is cut in half, as the modulation loss measurement process 600 does not have to do a sweep for both the RF scan 708 and the DC scan 712. As detailed in step 620 above, the contrast ratio 736 is determined by the difference between the PEAK RF power 724 and the NULL RF power 732. As detailed in step 624, above, the contrast ratio 736 is then used to calculate the modulation loss 704.

Referring now to FIG. 11, shown therein is an exemplary embodiment of a simulated graph 740 between a MON power scan 744 and a CPD power scan 748 as determined in situ, that is, during normal operation of the transmitter 70. The graph 740 depicts the MON power scan 744 and the CPD power scan 748 for a particular MZM 120, e.g., a particular one of paths TEI, TEQ, TMI, or TMQ. The graph 740 further includes the X-axis 716 depicting differential phase (dP), that is, the difference in power between the phase adjuster 516 of each MZM arm 504 within a particular MZM 120, and the Y-axis 720 depicting the power measured, e.g., as measured by one of the MON 526, the CPD 528, the SOA 520, or the MPD 506. While the CPD power scan 748 is described as a power measured by the CPD 528, in other embodiments, the CPD power scan 748 may be a power measurement by one or more of the CPD 528, and/or the MPD 506. As discussed below, the MPD 506 may be used in place of the CPD 528 except as otherwise identified. In one embodiment, as discussed above in more detail, in situ measurement of modulation loss does not require a sweep of the phase adjusters 516, that is, the sweep phase adjusters (step 616) can be omitted from the modulation loss measurement process 600.

In one embodiment, the MON power scan 744 may be the sum of the power detected both the MONs 526 optically coupled to a particular CPD 528. For example, the MON power scan 744 may be the sum of the power detected by the MON 526-1 and the MON 526-2 when the CPD power scan 748 is the power detected by the CPD 528. Alternatively, the MON power scan 744 may be the sum of the power detected by each of the MON 526-1 to 526-4 when the CPD power scan 748 is the power detected by the MPD 506.

In one embodiment, as shown in FIG. 11, with the RF signal is applied during operation of the transmitter 70, there may be a NULL RF power difference 752 between a NULL RF power of the MON power scan 744 and a NULL RF power of the CPD power scan 748. If the NULL RF power difference 752 is present and/or greater than a NULL power difference threshold, calibrating for background power (step 612) of the modulation loss measurement process 600 may further include calibrating the CPD 506 as discussed above.

FIG. 11 shows the CPD power scan 748 before calibrating for the NULL RF power difference 752. A contrast ratio 768 is defined as a power difference between the maximum power 756 of the MON power scan 744 and a minimum power 760 of the MON power scan 744. The minimum power 760 of the MON power scan 744 may be derived by determining a minimum power 762 of the CPD power scan 748 and adjusting for the NULL RF power difference 752. Therefore, once calibrated for the NULL RF power difference 752, the minimum power 760 may be derived from the power of the CPD power scan 748 at an operating point 764 while data is modulated onto the optical signal. In one embodiment of the modulation loss measurement process 600, therefore, determining the contrast ratio (step 620) for a particular MZM 120, e.g., a particular one of paths TEI, TEQ, TMI, or TMQ, may include calculating a calibrated RF minimum power by calculating the minimum power 762 of the CPD power scan 748 less the NULL RF power difference 752. The contrast ratio 768 may thus be calculated as the maximum power 756 of the MON power scan 744 less the calibrated RF minimum power. As detailed in step 624, above, the contrast ratio 736 is then used to calculate the modulation loss for the particular MZM 120, e.g., a particular one of paths TEI, TEQ, TMI, or TMQ.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
   determining a NULL background power of a power measurement device;
   sweeping each phase adjuster of an optical modulator by applying a first phase at a first point in time to get a first power and a second phase at a second point in time to get a second power, the first phase being different from the second phase;
   determining, by control and monitoring circuitry, a contrast ratio by determining a difference in power between the first power at the first point in time and the second power at the second point in time; and
   calculating a modulation loss based on the contrast ratio.

2. The method of claim 1, further comprising:
   before determining the NULL background power of power measurement device, determining whether calibration to determine the NULL background power is needed.

3. The method of claim 2, wherein sweeping the phase adjusters further includes applying the first phase at the first point in time to get the first power and the second phase at the second point in time to get the second power for the phase adjuster of each arm of an I path and a Q path of both a TE component and a TM component.

4. The method of claim 1, wherein sweeping each phase adjuster of the optical modulator includes selecting the first phase from a phase range of about 0 degrees to about 90 degrees and selecting the second phase from a phase range of about 0 degrees to about 90 degrees, wherein the first phase and the second phase are different.

5. The method of claim 1, further comprising: adjusting a setting of one or more of a modulator driver circuitry, the optical modulator, a high-speed phase modulator, and a phase adjuster based at least in part on the modulation loss.

6. The method of claim 1, wherein determining the NULL background power of the power measurement device includes determining a NULL background power of a monitor photodetector and a NULL background power of a complementary photodetector.

7. The method of claim 6, wherein sweeping each phase adjuster of the optical modulator includes determining a first power from the monitor photodetector and a first power from the complementary photodetector at a first point in time and a second power from the monitor photodetector and a second power from the complementary photodetector at a second point in time; and wherein determining, by control and monitoring circuitry, the contrast ratio further includes determining a difference in power between the first power from the monitor photodetector and the first power from the complementary photodetector at the first point in time and the second power from the monitor photodetector and the second power from the complementary photodetector at the second point in time.

8. The method of claim 7, wherein sweeping each phase adjuster of the optical modulator further includes sweeping each phase adjuster of the optical modulator while the optical modulator is modulating a data stream onto an optical signal.

9. The method of claim 1, further comprising sending an alert responsive to the modulation loss being at least one of higher than a maximum threshold or lower than a minimum threshold.

10. A transmitter, comprising:
    a laser operable to supply an optical signal;
    a digital signal processor operable to supply first electrical signals based on data input to the digital signal processor;
    a digital-to-analog conversion circuitry operable to output second electrical signals based on the first electrical signals;
    a modulator driver circuitry operable to output third electrical signals based on the second electrical signals;
    an optical modulator having a first arm with a first high-speed phase modulator and a first phase adjuster operable to modulate the optical signal into a first modulated optical signal based on the third electrical signals, the first modulated optical signal having a first power, and a second arm with a second high-speed phase modulator and a second phase adjuster operable to modulated the optical signal into a second modulated optical signal based on the third electrical signals, the second modulated optical signal having a second power;
    an optical combiner operable to combine the first modulated optical signal and the second modulated optical signal into a combined optical signal having a combined power and directing a first portion of the combined optical signal to a monitor photodetector;
    the monitor photodetector operable to measure the combined power of the combined optical signal; and
    control and monitoring circuitry coupled to the monitor photodetector and in communication with the optical modulator, and operable to cause the first phase adjuster to apply a first phase to the first modulated optical signal and the second phase adjuster to apply a second phase to the second modulated optical signal at a first point in time, to cause the first phase adjuster to apply a third phase to the first modulated optical signal and the second phase adjuster to apply a fourth phase to the second modulated optical signal at a second point in time, to compute a contrast ratio based on the combined power at the first point in time and the combined power at the second point in time, and to determine a modulation loss based at least in part on the contrast ratio.

11. The transmitter of claim 10, wherein the second phase and the fourth phase are selected from a phase range of 0 to 90 degrees and the first phase and the third phase are selected from a phase range of −90 to 0 degrees.

12. The transmitter of claim 11, wherein the first phase is opposite to the second phase and the third phase is opposite to the fourth phase.

13. The transmitter of claim 12, wherein the first phase and the third phase are separated by at least 90 degrees.

14. The transmitter of claim 10, wherein the control and monitoring circuitry is further operable to adjust a setting of one or more of the modulator driver circuitry, the optical modulator, the first high-speed phase modulator, the first phase adjuster, the second high-speed phase modulator, and the second phase adjuster based at least in part on the modulation loss.

15. The transmitter of claim 10, wherein the control and monitoring circuitry is further operable to output an alert responsive to the modulation loss being at least one of higher than a maximum threshold or lower than a minimum threshold.

16. The transmitter of claim 10, wherein the digital-to-analog conversion circuitry is a first digital-to-analog conversion circuitry, the modulator driver circuitry is a first a modulator driver circuitry, the optical modulator is a first optical modulator, the optical combiner is a first optical combiner, and the monitor photodetector is a first monitor photodetector, and wherein the digital signal processor is further operable to output fourth electrical signals, the transmitter further comprising:
  a second digital-to-analog conversion circuitry operable to output fifth electrical signals based on the fourth electrical signals;
  a second modulator driver circuitry operable to output sixth electrical signals based on the fourth electrical signals;
  a second optical modulator having a third arm with a third high-speed phase modulator and a third phase adjuster operable to modulate the optical signal into a third modulated optical signal based on the sixth electrical signals, the third modulated optical signal having a third power, and a fourth arm with a fourth high-speed phase modulator and a fourth phase adjuster operable to modulated the optical signal into a fourth modulated optical signal based on the sixth electrical signals, the fourth modulated optical signal having a fourth power;
  a second optical combiner operable to combine the third modulated optical signal and the fourth modulated optical signal into a second combined optical signal having a second combined power and directing a second portion of the second combined optical signal to a second monitor photodetector;
  the second monitor photodetector operable to measure the second combined power of the second combined optical signal; and
  wherein the control and monitoring circuitry is further coupled to the second monitor photodetector and in communication with the second optical modulator, and operable to cause the third phase adjuster to apply a fifth phase to the third modulated optical signal and the fourth phase adjuster to apply a sixth phase to the fourth modulated optical signal at a third point in time, to cause the third phase adjuster to apply a seventh phase to the third modulated optical signal and the fourth phase adjuster to apply an eighth phase to the fourth modulated optical signal at a fourth point in time, to compute a second contrast ratio based on the second combined power at the third point in time and the second combined power at the fourth point in time, and to determine a second modulation loss based at least in part on the second contrast ratio.

17. The transmitter of claim 16, wherein the control and monitoring circuitry is further operable to adjust a setting of one or more of the first modulator driver circuitry, the second optical modulator, the first high-speed phase modulator, the first phase adjuster, the second high-speed phase modulator, the second phase adjuster, the second modulator driver circuitry, the second optical modulator, the third high-speed phase modulator, the third phase adjuster, the fourth high-speed phase modulator, and the fourth phase adjuster based at least in part on the modulation loss.

18. A transmitter, comprising:
  a laser operable to supply an optical signal having a first portion and a second portion;
  a digital signal processor operable to supply first electrical signals based on data input to the digital signal processor;
  a digital-to-analog conversion circuitry operable to output second electrical signals based on the first electrical signals;
  a modulator driver circuitry operable to output third electrical signals based on the second electrical signals;
  an optical modulator having a first arm with a first high-speed phase modulator and a first phase adjuster operable to modulate the first portion of the optical signal into a first modulated optical signal based on the third electrical signals, the first modulated optical signal having a first power, and a second arm with a second high-speed phase modulator and a second phase adjuster operable to modulate the first portion of the optical signal into a second modulated optical signal based on the third electrical signals, the second modulated optical signal having a second power;
  a first monitor photodetector;
  a second optical combiner;
  a complementary photodetector;
  a first optical combiner operable to combine the first modulated optical signal and the second modulated optical signal into a first combined optical signal having a first combined power and directing a first portion of the first combined optical signal to the first monitor photodetector and a second portion of the first combined optical signal to the second optical combiner;
  the first monitor photodetector operable to measure the first combined power of the first combined optical signal;
  the second optical combiner operable to combine the second portion of the first combined optical signal and the second portion of the optical signal into a second combined optical signal having a second combined power and directing a first portion of the second combined output optical to the complementary photodiode;
  the complementary photodetector operable to measure the second combined power; and
  a control and monitoring circuitry coupled to the first monitor photodetector and the complementary photodetector, and operable to determine a contrast ratio based at least in part on the first combined optical power and the second combined power and to determine a modulation loss based at least in part on the contrast ratio.

19. The transmitter of claim 18, wherein the control and monitoring circuitry is further operable to adjust a setting of one or more of the modulator driver circuitry, optical modulator, first high-speed phase modulator, first phase adjuster, second high-speed phase modulator, and second phase adjuster based at least in part on the modulation loss.

20. The transmitter of claim 18, wherein the control and monitoring circuitry is further operable to output an alert responsive to the modulation loss being at least one of higher than a maximum threshold or lower than a minimum threshold.

* * * * *